US012580708B2

(12) United States Patent
Khoshnevisan et al.

(10) Patent No.: US 12,580,708 B2
(45) Date of Patent: Mar. 17, 2026

(54) TIME DOMAIN ORTHOGONAL COVER CODE FOR SOUNDING REFERENCE SIGNAL TRANSMISSIONS

(71) Applicant: QUALCOMM Incorporated, San Diego, CA (US)

(72) Inventors: Mostafa Khoshnevisan, San Diego, CA (US); Yitao Chen, San Diego, CA (US); Muhammad Sayed Khairy Abdelghaffar, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 518 days.

(21) Appl. No.: 17/815,822

(22) Filed: Jul. 28, 2022

(65) Prior Publication Data

US 2024/0048321 A1     Feb. 8, 2024

(51) Int. Cl.
H04L 5/00 (2006.01)
(52) U.S. Cl.
CPC .......... H04L 5/0051 (2013.01); H04L 5/0094 (2013.01); H04L 5/0096 (2013.01)
(58) Field of Classification Search
CPC .... H04L 5/0051; H04L 5/0094; H04L 5/0096
See application file for complete search history.

(56) References Cited

U.S. PATENT DOCUMENTS

2011/0243066 A1* 10/2011 Nayeb Nazar ........ H04L 5/0055
                                                        370/328
2019/0280734 A1    9/2019 Park et al.
2020/0220681 A1*   7/2020 Yang ........................ H04L 5/001
2021/0075577 A1*   3/2021 Zhang .................... H04L 5/0094
2021/0167925 A1*   6/2021 Qi .......................... H04L 5/0053

FOREIGN PATENT DOCUMENTS

EP         3998793 A1 * 5/2022 ........... H04B 7/0608
WO      WO-2021155505 A1   8/2021
WO      WO-2023164913 A1   9/2023
WO      WO-2023164935 A1   9/2023

OTHER PUBLICATIONS

NTT Docomo, Inc., Discussion on SRS enhancement, 3GPP TSG RAN WG1 #108-e, e-Meeting, May 9-20, 2022, R1-2204371 (Year: 2017).*
"The Authoritative Dictionary of IEEE Standards Terms, Seventh Edition," in IEEE Std 100-2000 , vol. no., pp. 1-1362, Dec. 11, 2000, doi: 10.1109/IEEESTD.2000.322230. (Year: 2000).*
International Search Report and Written Opinion—PCT/US2023/070824—ISA/EPO—Nov. 17, 2023.

* cited by examiner

*Primary Examiner* — Joseph A Bednash
(74) *Attorney, Agent, or Firm* — Harrity & Harrity, LLP

(57)     ABSTRACT

Various aspects of the present disclosure generally relate to wireless communication. In some aspects, a user equipment (UE) may receive a configuration of a sounding reference signal (SRS) resource. The UE may receive one or more indications indicating that an SRS associated with the SRS resource should be transmitted using a time domain orthogonal cover code (TD-OCC) and that the UE should perform TD-OCC hopping when transmitting the SRS associated with the SRS resource. The UE may transmit the SRS using the SRS resource based at least in part on the configuration of the SRS resource and by performing the TD-OCC hopping. Numerous other aspects are described.

30 Claims, 13 Drawing Sheets

900

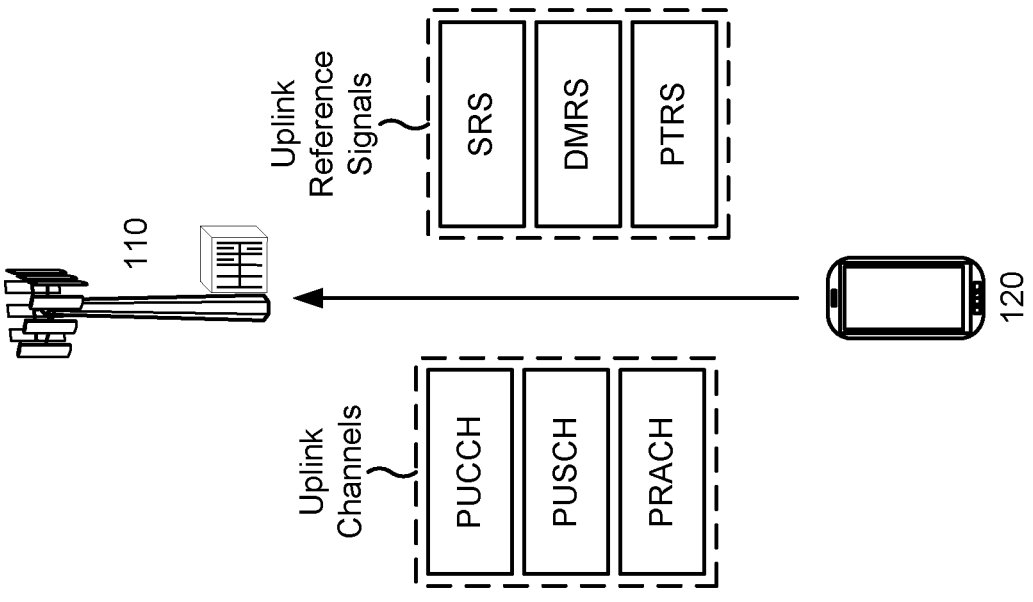
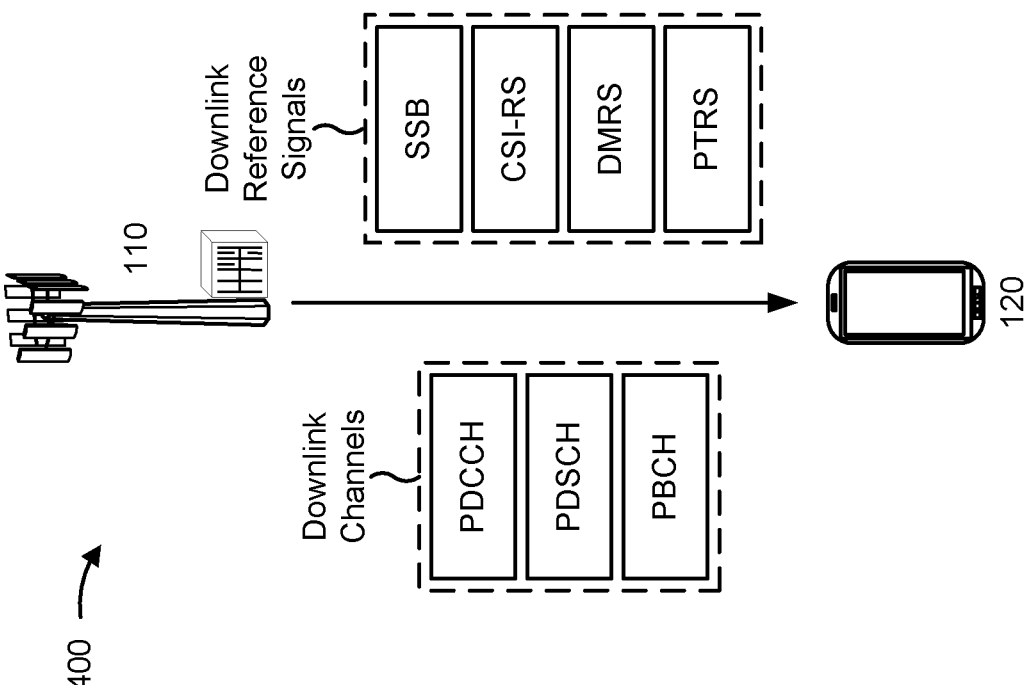
FIG. 4

Maximum number of cyclic shifts ($n_{SRS}^{cs,max}$) as a function of transmission comb ($K_{TC}$):

| $K_{TC}$ | $n_{SRS}^{cs,max}$ |
|---|---|
| 2 | 8 |
| 4 | 12 |
| 8 | 6 |

= Comb spacing 2; offset 0
= Comb spacing 2; offset 1
= Comb spacing 4; offset 0
= Comb spacing 4; offset 2
= Comb spacing 8; offset 1

OFDM Symbol Index

Subcarrier Index

Ports 1001, 1003
Ports 1001, 1003
Ports 1000 ... 1003
Ports 1000 ... 1003
Ports 1000, 1002
Ports 1000, 1002

705
SRS Resource Configuration:
N = 4; R = 4; X = 4; 1 port;
Periodic (every 2^nd slot)

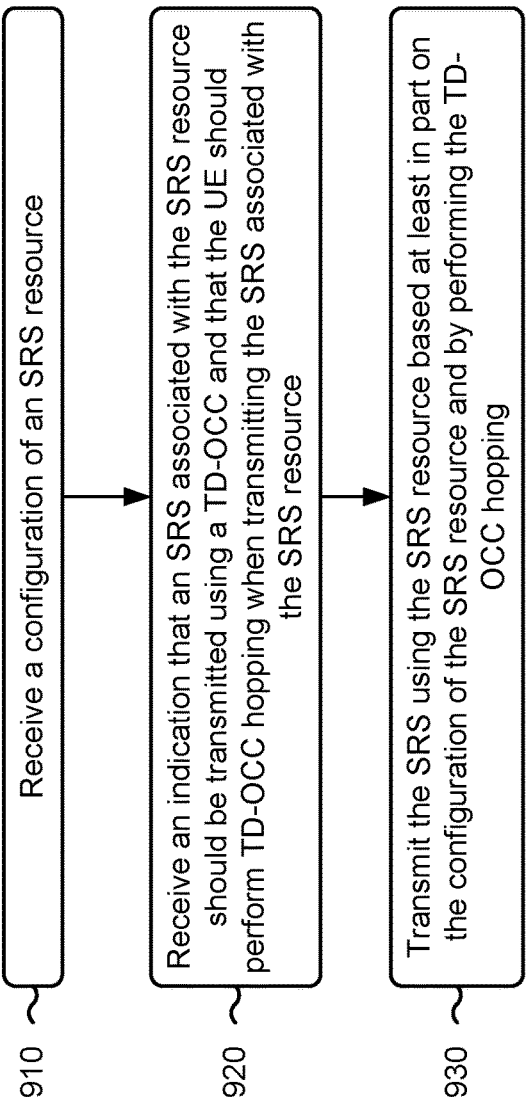

910 Receive a configuration of an SRS resource

920 Receive an indication that an SRS associated with the SRS resource should be transmitted using a TD-OCC and that the UE should perform TD-OCC hopping when transmitting the SRS associated with the SRS resource 930 Transmit the SRS using the SRS resource based at least in part on the configuration of the SRS resource and by performing the TD-OCC hopping

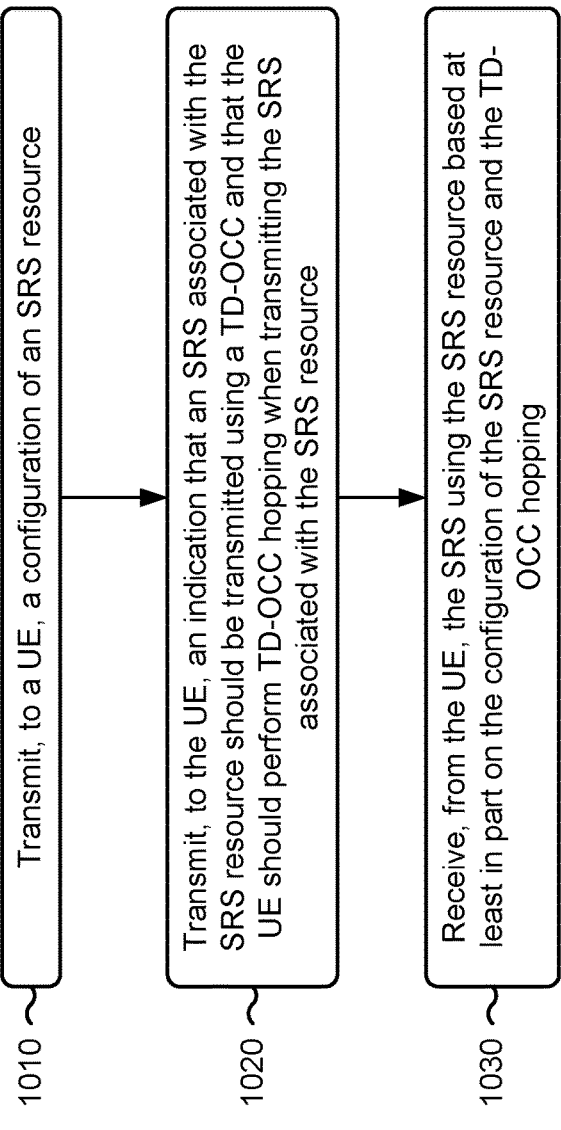

Transmit, to a UE, a configuration of an SRS resource

1010

Transmit, to the UE, an indication that an SRS associated with the SRS resource should be transmitted using a TD-OCC and that the UE should perform TD-OCC hopping when transmitting the SRS associated with the SRS resource

1020

Receive, from the UE, the SRS using the SRS resource based at least in part on the configuration of the SRS resource and the TD-OCC hopping

TIME DOMAIN ORTHOGONAL COVER CODE FOR SOUNDING REFERENCE SIGNAL TRANSMISSIONS

FIELD OF THE DISCLOSURE

Aspects of the present disclosure generally relate to wireless communication and to techniques and apparatuses for time domain orthogonal cover code for sounding reference signal transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration of a sounding reference signal (SRS) resource. The method may include receiving one or more indications indicating that an SRS associated with the SRS resource should be transmitted using a time domain orthogonal cover code (TD-OCC) and that the UE should perform TD-OCC hopping when transmitting the SRS associated with the SRS resource. The method may include transmitting the SRS using the SRS resource based at least in part on the configuration of the SRS resource and by performing the TD-OCC hopping.

Some aspects described herein relate to a method of wireless communication performed by a network node. The method may include transmitting, to a UE, a configuration of an SRS resource. The method may include transmitting, to the UE, one or more indications indicating that an SRS associated with the SRS resource should be transmitted using a TD-OCC and that the UE should perform TD-OCC hopping when transmitting the SRS associated with the SRS resource. The method may include receiving, from the UE, the SRS using the SRS resource based at least in part on the configuration of the SRS resource and the TD-OCC hopping.

Some aspects described herein relate to an apparatus for wireless communication at a UE. The apparatus may include a memory and one or more processors coupled to the memory. The one or more processors may be configured to receive a configuration of an SRS resource. The one or more processors may be configured to receive one or more indications indicating that an SRS associated with the SRS resource should be transmitted using a TD-OCC and that the UE should perform TD-OCC hopping when transmitting the SRS associated with the SRS resource. The one or more processors may be configured to transmit the SRS using the SRS resource based at least in part on the configuration of the SRS resource and by performing the TD-OCC hopping.

Some aspects described herein relate to an apparatus for wireless communication at a network node. The apparatus may include a memory and one or more processors coupled to the memory. The one or more processors may be configured to transmit, to a UE, a configuration of an SRS resource. The one or more processors may be configured to transmit, to the UE, one or more indications indicating that an SRS associated with the SRS resource should be transmitted using a TD-OCC and that the UE should perform TD-OCC hopping when transmitting the SRS associated with the SRS resource. The one or more processors may be configured to receive, from the UE, the SRS using the SRS resource based at least in part on the configuration of the SRS resource and the TD-OCC hopping.

Some aspects described herein relate to a non-transitory computer-readable medium that stores a set of instructions for wireless communication by a UE. The set of instructions, when executed by one or more processors of the UE, may cause the UE to receive a configuration of an SRS resource. The set of instructions, when executed by one or more processors of the UE, may cause the UE to receive one or more indications indicating that an SRS associated with the SRS resource should be transmitted using a TD-OCC and that the UE should perform TD-OCC hopping when transmitting the SRS associated with the SRS resource. The set of instructions, when executed by one or more processors of the UE, may cause the UE to transmit the SRS using the SRS resource based at least in part on the configuration of the SRS resource and by performing the TD-OCC hopping.

Some aspects described herein relate to a non-transitory computer-readable medium that stores a set of instructions for wireless communication by a network node. The set of instructions, when executed by one or more processors of the network node, may cause the network node to transmit, to a UE, a configuration of an SRS resource. The set of instructions, when executed by one or more processors of the network node, may cause the network node to transmit, to the UE, one or more indications indicating that an SRS associated with the SRS resource should be transmitted using a TD-OCC and that the UE should perform TD-OCC hopping when transmitting the SRS associated with the SRS resource. The set of instructions, when executed by one or more processors of the network node, may cause the network node to receive, from the UE, the SRS using the SRS resource based at least in part on the configuration of the SRS resource and the TD-OCC hopping.

Some aspects described herein relate to an apparatus for wireless communication. The apparatus may include means for receiving a configuration of an SRS resource. The apparatus may include means for receiving one or more indications indicating that an SRS associated with the SRS resource should be transmitted using a TD-OCC and that the apparatus should perform TD-OCC hopping when transmitting the SRS associated with the SRS resource. The apparatus may include means for transmitting the SRS using the SRS resource based at least in part on the configuration of the SRS resource and by performing the TD-OCC hopping.

Some aspects described herein relate to an apparatus for wireless communication. The apparatus may include means for transmitting, to a UE, a configuration of an SRS resource. The apparatus may include means for transmitting, to the UE, one or more indications indicating that an SRS associated with the SRS resource should be transmitted using a TD-OCC and that the UE should perform TD-OCC hopping when transmitting the SRS associated with the SRS resource. The apparatus may include means for receiving, from the UE, the SRS using the SRS resource based at least in part on the configuration of the SRS resource and the TD-OCC hopping.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

FIG. 6 is a diagram illustrating an example of time/frequency resources associated with an SRS, in accordance with the present disclosure.

FIG. 9 is a diagram illustrating an example process performed, for example, by a UE, in accordance with the present disclosure.

FIG. 10 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
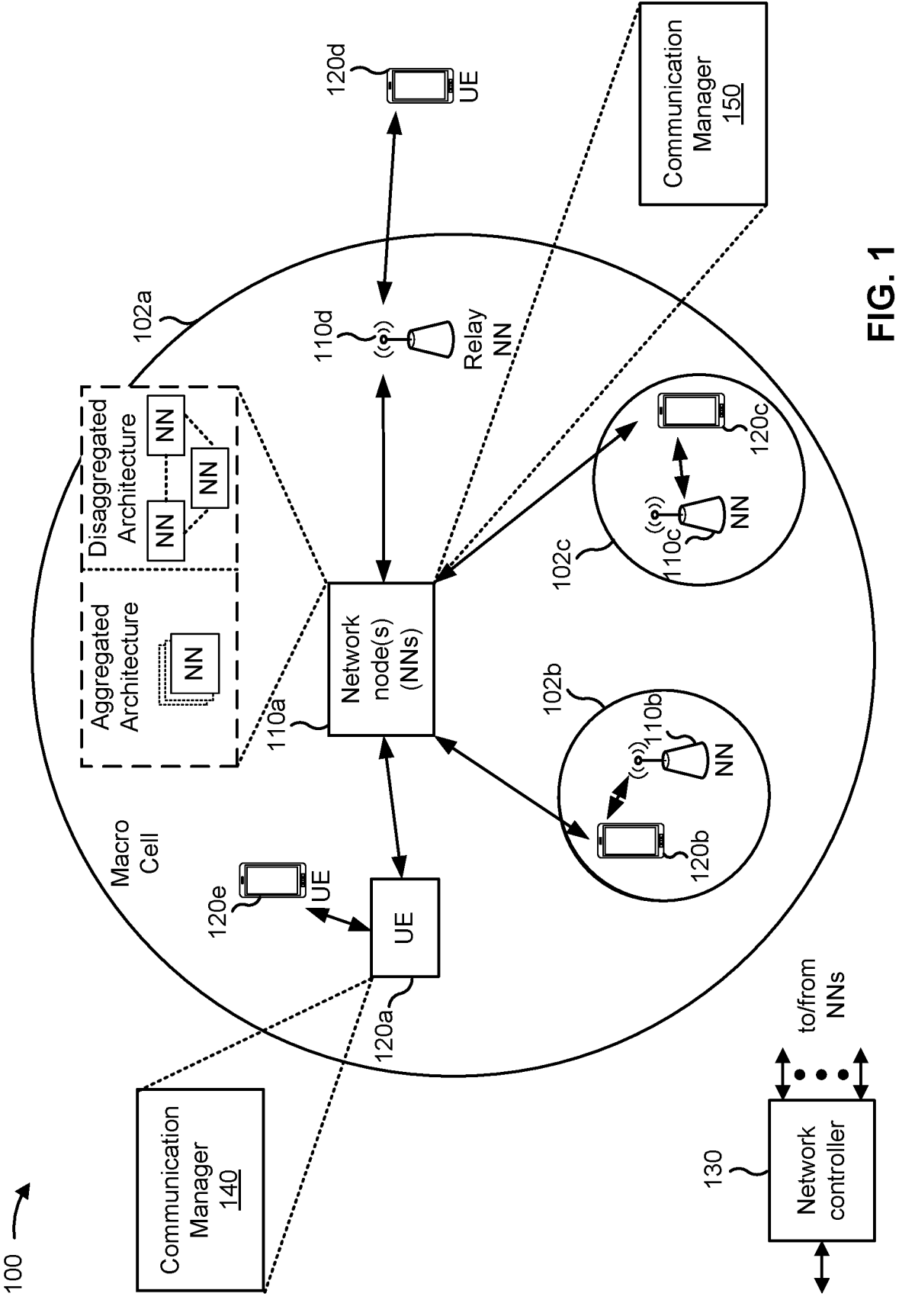
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration of a sounding reference signal (SRS) resource; receive one or more indications indicating that an SRS associated with the SRS resource should be transmitted using a time domain orthogonal cover code (TD-OCC) and that the UE should perform TD-OCC hopping when transmitting the SRS associated with the SRS resource; and transmit the SRS using the SRS resource based at least in part on the configuration of the SRS resource and by performing the TD-OCC hopping. Additionally, or alternatively, the communication manager 140 may perform one or more other operations described herein.

In some aspects, the network node 110 may include a communication manager 150. As described in more detail elsewhere herein, the communication manager 150 may transmit, to a UE (e.g., UE 120), a configuration of an SRS resource; transmit, to the UE, one or more indications indicating that an SRS associated with the SRS resource should be transmitted using a TD-OCC and that the UE should perform TD-OCC hopping when transmitting the SRS associated with the SRS resource; and receive, from the UE, the SRS using the SRS resource based at least in part on the configuration of the SRS resource and the TD-OCC hopping. Additionally, or alternatively, the communication manager 150 may perform one or more other operations described herein.

As indicated above, FIG. 1 is provided as an example. Other examples may differ from what is described with regard to FIG. 1.

Figure 2:
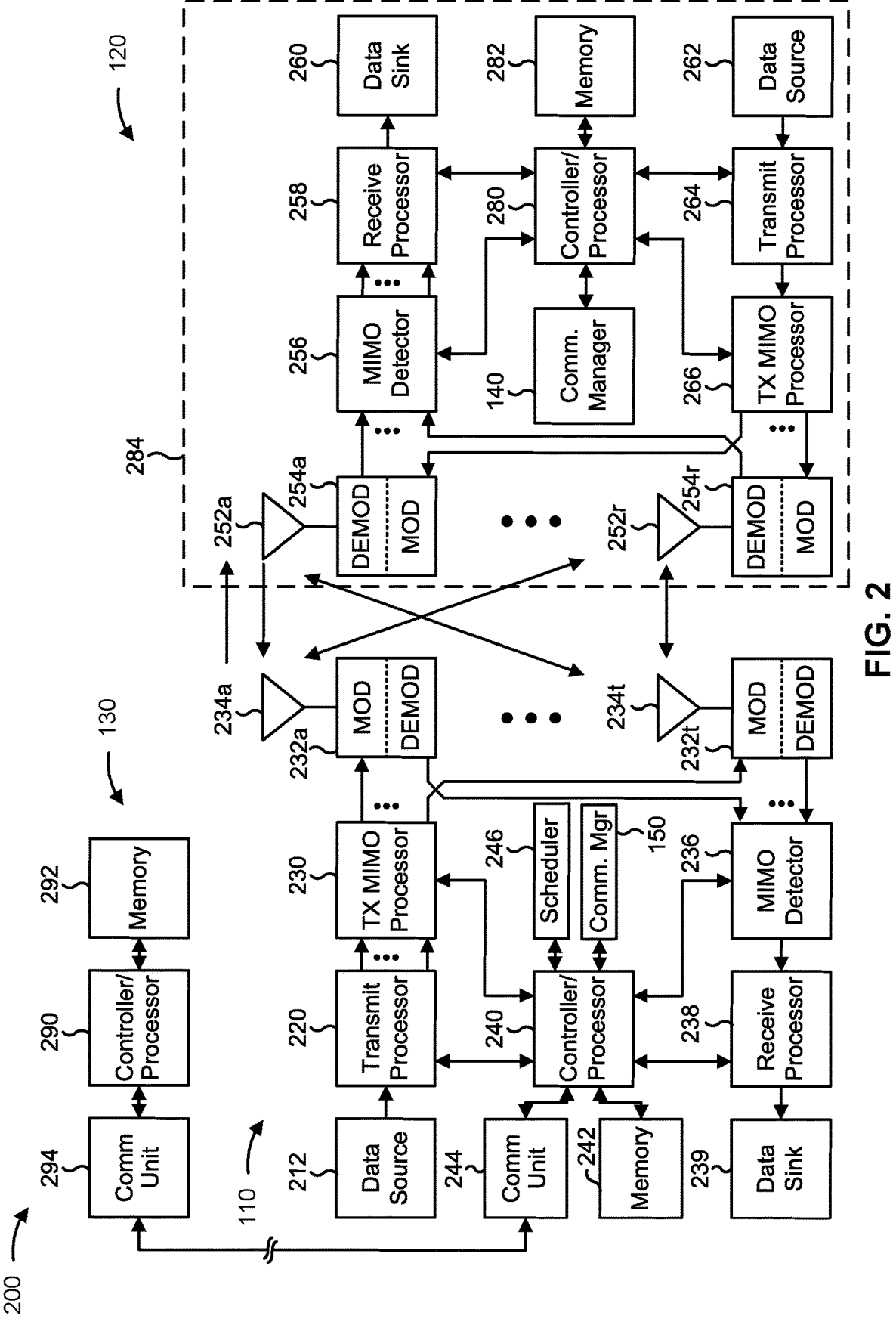
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1).

The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-12).

The controller/processor 240 of the network node 110, the controller/processor 280 of the UE 120, and/or any other component(s) of FIG. 2 may perform one or more techniques associated with TD-OCC for SRS transmissions, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving a configuration of an SRS resource; means for receiving one or more indications indicating that an SRS associated with the SRS resource should be transmitted using a TD-OCC and that the UE 120 should perform TD-OCC hopping when transmitting the SRS associated with the SRS resource; and/or means for transmitting the SRS using the SRS resource based at least in part on the configuration of the SRS resource and by performing the TD-OCC hopping. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE (e.g., UE 120), a configuration of an SRS resource; means for transmitting, to the UE, one or more indications indicating that an SRS associated with the SRS resource should be transmitted using a TD-OCC and that the UE should perform TD-OCC hopping when transmitting the SRS associated with the SRS resource; and/or means for receiving, from the UE, the SRS using the SRS resource based at least in part on the configuration of the SRS resource and the TD-OCC hopping. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
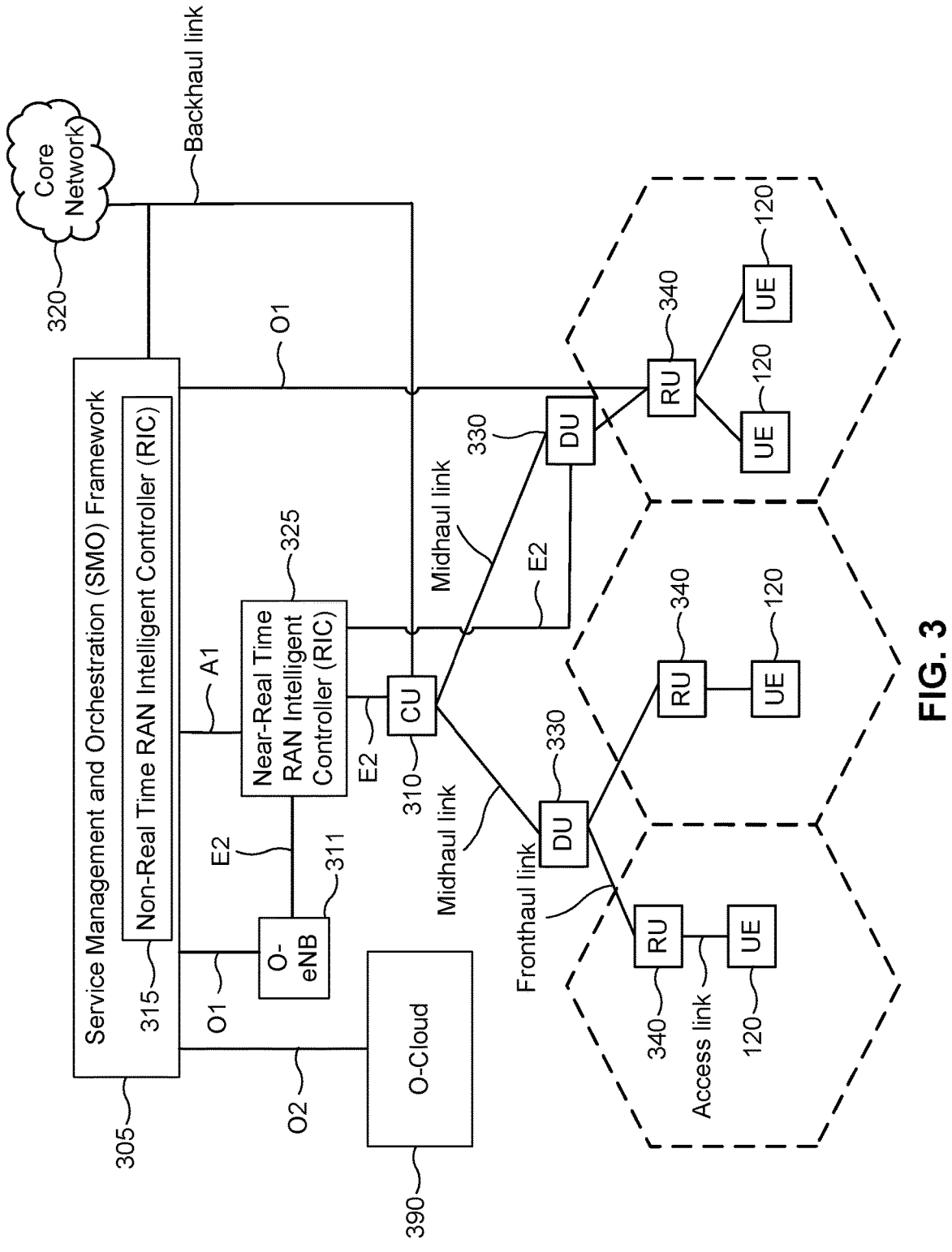
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include an SRS, a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120. SRSs, SRS resources, and SRS resource sets as described in more detail below in connection with FIG. 5.

As indicated above, FIG. 4 is provided as an example. Other examples may differ from what is described with regard to FIG. 4.

Figure 5:
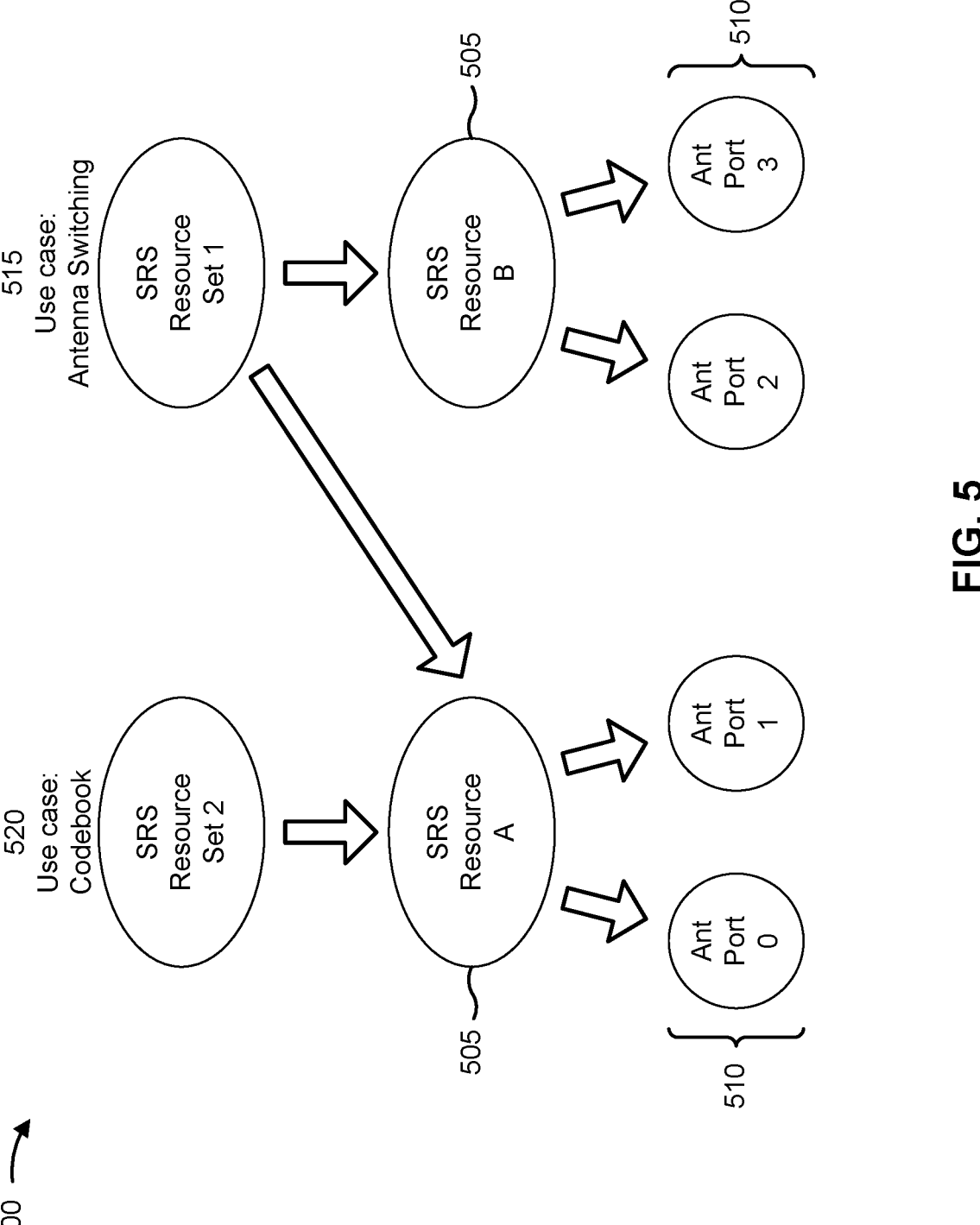
FIG. 5 is a diagram illustrating an example of sound reference signal (SRS) resource sets, in accordance with the present disclosure.

FIG. 5 is a diagram illustrating an example 500 of SRS resource sets, in accordance with the present disclosure.

A UE 120 may be configured with one or more SRS resource sets to allocate resources for SRS transmissions by the UE 120. For example, a configuration for SRS resource sets may be indicated in an RRC message (e.g., an RRC configuration message or an RRC reconfiguration message). As shown by reference number 505, an SRS resource set may include one or more resources (e.g., shown as SRS resources), which may include time resources and/or frequency resources (e.g., a slot, a symbol, a resource block, and/or a periodicity for the time resources).

As shown by reference number 510, an SRS resource may include one or more antenna ports (sometimes referred to as SRS ports) on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a network node 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a network node 110 indicates an uplink precoder to the UE 120. For example, when the network node 110 is configured to indicate an uplink precoder to the UE 120 (e.g., using a precoder codebook), the network node 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the network node 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the network node 110 indicating an uplink precoder to be used by the UE 120). For example, when the UE 120 is configured to select an uplink precoder, the network node 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the network node 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot. The UE 120 may be configured with X SRS ports (e.g., where X≤4).

In some aspects, each of the X SRS ports may mapped to a corresponding symbol of the SRS resource and used for transmission of an SRS in that symbol.

As shown in FIG. 5, in some aspects, different SRS resource sets indicated to the UE 120 (e.g., having different use cases) may overlap (e.g., in time and/or in frequency, such as in the same slot). For example, as shown by reference number 515, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 520, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

In some cases, multiple UEs 120 may transmit SRSs using overlapping time and/or frequency resources, which may cause interference at a receiver (e.g., a network node 110). Accordingly, in some instances, an SRS resource and/or an SRS resource set may be configured with a cyclic shift, a comb spacing, and/or a comb offset such that SRSs originating from multiple UEs 120 are orthogonal to one another in order to reduce interference at a receiver caused by the overlapping SRSs. Details of overlapping SRSs are described in more detail in connection with FIG. 6.

As indicated above, FIG. 5 is provided as an example. Other examples may differ from what is described with regard to FIG. 5.

FIG. 6 is a diagram illustrating an example 600 of time/frequency resources associated with an SRS, in accordance with the present disclosure.

The time/frequency resources shown in FIG. 6 include one slot in the time domain, which includes fourteen OFDM symbols indexed 0 to 13, and one resource block in the frequency domain, which includes twelve subcarriers indexed 0 to 11. In some examples, an SRS transmission may occupy a number of OFDM symbols in the time domain, such as one or more of the OFDM symbols indexed 8 to 13 in the depicted example. Moreover, an SRS transmission may occupy up to 272 resource blocks in the frequency domain. However, an individual UE 120 may not transmit the SRS on every subcarrier, but instead may use a transmission comb to select a specific set of subcarriers.

For example, the UE 120 may select subcarriers using a configured transmission comb spacing ($K_{TC}$) of 2, 4, or 8. A transmission comb spacing of 2 means that an individual UE 120 transmits on every second subcarrier, as is illustrated in OFDM symbols 8 and 9 in FIG. 6. A transmission comb spacing of 4 means that an individual UE 120 transmits on every fourth subcarrier, as is illustrated in OFDM symbols 11 and 12 in FIG. 6. And a transmission comb spacing of 8 means that an individual UE 120 transmits on every eighth subcarrier, as is illustrated in OFDM symbol 13 in FIG. 6. An SRS resource may also be configured with a comb offset (sometimes referred to as CombOffset, or $\bar{K}_{TC}$), which determines a starting resource element for the SRS. The comb offset may be configured as 0, 1, . . . , $K_{TC}$−1 per SRS resource. For example, a first SRS resource in OFDM symbols 8 and 9 in FIG. 6 is configured with a transmission comb spacing of 2 and a comb offset of 0, a second SRS resource in OFDM symbols 8 and 9 is configured with a transmission comb spacing of 2 and a comb offset of 1, a third SRS resource in OFDM symbols 11 and 12 is configured with a transmission comb spacing of 4 and a comb offset of 0, a fourth SRS resource in OFDM symbols 11 and 12 is configured with a transmission comb spacing of 4 and a comb offset of 2, and a fifth SRS resource in OFDM symbol 13 is configured with a transmission comb spacing of 8 and a comb offset of 3.

Each transmission comb allows multiple groups of UEs 120 to be frequency multiplexed within a given OFDM symbol. For example, a transmission comb spacing of 2 permits two groups of UEs 120 to be frequency multiplexed with a single subcarrier offset between the two groups, as is shown in OFDM symbols 8 and 9. A transmission comb spacing of 4 permits up to four groups of UEs 120 to be frequency multiplexed within an OFDM symbol. And a transmission comb spacing of 8 permits up to eight groups of UEs 120 to be frequency multiplexed within an OFDM symbol. As transmission comb spacing increases, the quality of the SRS measurements may be reduced because fewer resource elements are used to transmit the SRS.

Moreover, multiple SRSs may be sent in a given resource element (e.g., a group of UEs 120 may utilize the same SRS resource) because each UE 120 may be configured to transmit, as the SRS, a base sequence (e.g., a Zadoff-Chu sequence) with a specific cyclic shift. A length of the base sequence may be equal to a number of allocated resource elements for the SRS, and thus is dependent on the number of resource blocks allocated for the SRS (which may be up to 272 resource blocks) and the transmission comb spacing used (which may be 2, 4, or 8, as described). The base sequence may be selected such that, when each SRS is shifted according to the configured cyclic shift, the SRSs are orthogonalized. Thus, a first SRS transmitted by a first UE 120 according to a first cyclic shift will be orthogonal to a second SRS transmitted by a second UE 120 according to a second cyclic shift, and thus may be transmitted using the same SRS resource with little interference at the receiver (e.g., base station or the like). The number of cyclic shifts ($n_{SRS}^{cs,max}$) available for a given SRS resource may be dependent on the transmission comb spacing being used to transmit the SRS. For example, there may be eight cyclic shifts available when using a transmission comb spacing of 2, twelve cyclic shifts available when using a transmission comb spacing of 4, and six cyclic shifts available when using a transmission comb spacing of 6. Each UE 120 may be configured with a cyclic shift index ($n_{SRS}^{cs}$), which may be configured as 0, 1, . . . , $n_{SRS}^{cs,max}$−1 per SRS resource.

In addition to different cyclic shifts being allocated to different UEs 120, when a UE 120 is using multiple ports to transmit the SRS, different cyclic shifts may be allocated to different antenna ports (e.g., a UE 120 which transmits the SRS from four antenna ports may be configured with four cyclic shifts). More particularly, in each SRS symbol, a UE 120 may sound all SRS ports. In some cases, all SRS ports are sounded in the same set of resource elements (REs) within the SRS symbol. Thus, for an SRS resource associated with four antenna ports (sometimes indexed as ports 1000, 1001, 1002, and 1003), all four ports are sounded in the same set of REs via four different cyclic shifts. In some other cases, such as instances in which a comb spacing is equal to 4, SRS ports may be sounded in different REs within the SRS symbol. That is, ports 1000 and 1002 may be sounded using two different cyclic shifts in a first set of REs associated with a first comb offset, and ports 1001 and 1003 may be sounded using two different cyclic shifts in a second set of REs associated with a second comb offset different from the first comb offset.

In some cases, $\bar{r}_{u,v}$ (n) may be used to represent the base sequence to be transmitted as the SRS (with $0 \leq n <$ the length of the sequence), and $\alpha_i$ may be a cyclic shift applied to the base sequence. In such examples, the sequence transmitted by a UE 120 may be equal to $e^{j\alpha_i n} \times \bar{r}_{u,v}(n)$. The cyclic shift, may be equal to $$2\pi \frac{n_{SRS}^{cs,i}}{n_{SRS}^{cs,max}},$$

with $n_{SRS}^{cs,i}$ being equal to $$\left( n_{SRS}^{cs} + \frac{n_{SRS}^{cs,max}(p_i - 1000)}{N_{ap}^{SRS}} \right)$$

mod $n_{SRS}^{cs,max}$, with $p_i$ corresponding to the antenna port number used to transmit the SRS (which may be 1000, 1001, 1002, or 1003), and with $N_{ap}^{SRS}$ corresponding to the number of allocated antenna ports (which sometimes may be referred to as nrofSRS-Ports). Thus, $\alpha_i$ may be equal to $\{0, 1, 2, \ldots, 5, 6, 7\} \times 2\pi/8$ when using a transmission comb spacing of 2, may be equal to $\{0, 1, 2, \ldots 9, 10, 11\} \times 2\pi/12$ when using a transmission comb spacing of 4, and may be equal to $\{0, 1, 2, 3, 4, 5\} \times 2\pi/6$ when using a transmission comb spacing of 8. Applying the cyclic shift to the base sequence in the manner described ensures mutual orthogonality among all antenna ports of a given SRS resource, and/or among different SRS resources of the same or different UEs 120.

Moreover, in some examples, multiple base sequences (e.g., multiple $\bar{r}_{uv}(n)$) of flexible length may be available for use as the SRS. The particular sequence (e.g., $\bar{r}_{uv}(n)$) to be used by a UE 120 may be determined using two steps. The first step selects a group of sequences. In some instances, for a given length of SRS, there may be 30 groups of sequences, and these groups may be indexed using the variable u (e.g., $u \in \{0, 1, \ldots, 29\}$). The second step selects a sequence from within the group. Each group may include one sequence for sequences having a length less than 72, indexed as v=0, and may include two sequences for sequences having a length greater than or equal to 72, indexed as $v \in \{1, 2\}$. In some cases, different base sequences (different (u, v)) may not be completely orthogonal but may nonetheless exhibit low cross-correlation such that interference between SRSs of different base sequences at the receiver is low.

The group, u, may be selected according to the equation $u=(f_{gh}(n_{s,f}^{\mu},l') \ n_{ID}^{SRS})$ mod 30, where $n_{ID}^{SRS}$ is an SRS sequence identity configured per SRS resource, and the component $f_{gh}(n_{s,f}^{\mu},l')$ is dependent on whether group or sequence hopping is configured for the SRS resource, which may be indicated using a group or sequence hopping parameter (sometimes referred to as groupOrSequenceHopping). Group or sequence hopping may be used to pseudo-randomly switch between groups of sequences used for an SRS resource (e.g., u) or to pseudo-randomly switch between sequences within groups used for an SRS resource (e.g., v)

in an effort to randomize interference at the receiver. If the group or sequence hopping parameter (e.g., groupOrSequenceHopping) indicates that neither group nor sequence hopping is to be utilized, $f_{gh}(n_{s,f}^{\mu},l')=0$ and v=0, and thus the group index only depends on the SRS sequence identity (e.g., $u=n_{ID}^{SRS}$mod 30). In such examples, the base sequence is fixed in all OFDM symbols in all SRS slots for the SRS transmission in that SRS resource. Thus, for such instances, a network entity (e.g., a network node 110) configuring one or more SRS resources may utilize interference planning techniques to minimize interference at the receiver, such as carefully assigning respective SRS sequence identities (e.g., $n_{ID}^{SRS}$) to different SRS resources of different UEs 120 to avoid interference at the receiver (e.g., neighboring cells may be configured with values that generate different results from $n_{ID}^{SRS}$mod 30 to ensure that neighboring cells use different groups of sequences).

If the group or sequence hopping parameter (e.g., groupOrSequenceHopping) indicates that group hopping should be utilized, then v=0 while $f_{gh}(n_{s,f}^{\mu},l')$ generates a pseudo-random result dependent on slot and symbol timing, with $n_{s,f}^{\mu}$, corresponding to the slot number within the radio frame for subcarrier spacing $\mu$, and l' corresponding to a symbol number within the slot. More particularly, $f_{gh}(n_{s,f}^{\mu}, l')=(\Sigma_{m=0}^{7}c(8(n_{s,f}^{\mu}N_{symb}^{slot}+l_0+l')+m) \times 2^m)$ mod 30, where c(i) is a pseudo-random sequence that is initialized as $c_{init}=n_{ID}^{SRS}$ at the beginning of each radio frame.

If the group or sequence hopping parameter (e.g., groupOrSequenceHopping) indicates that sequence hopping should be utilized, then $f_{gh}(n_{s,f}^{\mu},l')=0$ (e.g., the group index only depends on the SRS sequence identity (e.g., $u=n_{ID}^{SRS}$mod 30)) while v is based upon a pseudo-random result dependent on slot and symbol timing. More particularly, $$v = \begin{cases} c\left(n_{s,f}^{\mu}N_{symb}^{slot} + l_0 + l'\right) & M_{sc,b}^{SRS} \geq 6N_{sc}^{RB} \\ 0 & \text{otherwise} \end{cases},$$

where c(i) is a pseudo-random sequence that is initialized as $c_{init}=n_{ID}^{SRS}$ at the beginning of each radio frame.

Moreover, in some examples, frequency hopping may be used to pseudo-randomly switch between frequency bands used to transmit the SRS, also in an effort to randomize interference at the receiver. More particularly, when the SRS spans less than a maximum bandwidth for SRS transmissions (e.g., 272 resource blocks), then an SRS resource may be configured with frequency hopping such that the SRS is transmitted using different portions (e.g., different frequency hops) of the SRS bandwidth. In some cases, each SRS resource may be configured with N OFDM symbols and R repetitions. When R=N, the SRS is repeated in the same frequency hop in each SRS symbol, meaning there is no frequency hopping. However, if R<1V, there are N/R frequency hops within the SRS resource. In some cases, when N is equal to 1, R will be equal to 1; when N is equal to 2, R may be equal to 1 or 2; when N is equal to 4, R may be equal to 1, 2, or 4; when N is equal to 8, R may be equal to 1, 2, 4, or 8; when N is equal to 10, R may be equal to 1, 2, 5, or 10; when N is equal to 12, R may be equal to 1, 2, 3, 6, or 12; and when N is equal to 14, R may be equal to 1, 2, 7, or 14.

In some cases, a TD-OCC may be further implemented across multiple OFDM symbols to increase (e.g., double) orthogonal port generation for certain reference signals, such as SRSs, or the like. In two-port TD-OCC, for two different REs on the same subcarrier but in different symbols, two ports are code division multiplexed, such as by using TD-OCC sequences of {1,1} and {1,–1}. For example, in the first OFDM symbol, p1+p2 may be transmitted; and in the second OFDM symbol, p1–p2 may be transmitted; where p1 is the first port and p2 is the second port. For four-port TD-OCC, four ports are code division multiplexed, such as by using TD-OCC sequences of {1,1, 1,1}, {1,–1,1,–1},{1,1,–1,–1}, and {1,–1,–1,1}. For example, in the first OFDM symbol, p1+p2+p3+p4 may be transmitted; in the second OFDM symbol, p1–p2+p3+p4 may be transmitted; in the third OFDM symbol, p1+p2–p3–p4 may be transmitted; and in the fourth OFDM symbol, p1–p2–p3+p4 may transmitted; where p1 is the first port, p2 is the second port, p3 is the third port, and p4 is the fourth port. More generally, for TD-OCC of length X, where X is a power of 2 (e.g., 2, 4, 8, and so forth), a Walsh code of length X may be used across X symbols. In some other cases, other codebooks may be implemented, such as a DFT-based codebook implementing complex numbers (e.g., a codebook including {1, j, 1, j}, {1, –j, 1, –j}), or the like.

Moreover, in some examples, TD-OCC may be used across different UEs 120, or both across different ports of a UE 120 and across different UEs 120. For example, a first UE 120 may be configured with an SRS resource with two ports using TD-OCC sequences of {1,1,1,1} and {1,–1,1,–1} across four OFDM symbols, and a second UE 120 may be configured with an SRS resource with two ports using TD-OCC sequences of {1,1,–1,–1} and {1,–1,–1,1} across 4 OFDM symbols. Using TD-OCC across different ports of a UE 120 and/or across different UEs 120 may increase the capacity of SRS as the same cyclic shift and the same comb offset can be used for multiple SRS ports of the SRS resource, or for multiple UEs 120.

Although the interference planning, group hopping, sequence hopping, frequency hopping, and/or TD-OCC techniques described above may reduce and/or randomize some SRS interference at a receiver, SRSs may nonetheless still interfere with one another. For example, in coherent joint transmission (CJT) schemes, one or more UEs 120 are coherently served by multiple TRPs (e.g., a cluster of TRPs), and thus the network may need information about channels between each TRP and a given UE 120 in order to select transmission weights or other transmission parameters. Accordingly, each TRP of the multiple TRPs may need to receive SRS transmissions from a given UE 120, requiring the UE 120 to transmit an SRS transmission with a large amount of power, thus increasing the likelihood of the SRS transmission reaching other network entities and causing interference. This may be particularly problematic when a large number of CJT UEs 120 are near to one another, requiring multiple UEs 120 to send SRS transmissions on the same OFDM symbols, thus increasing the likelihood of inter-cell and/or inter-cluster interference at the various receivers. In such scenarios, the above interference mitigation techniques may insufficiently mitigate SRS interference, leading to degraded SRS reception and channel quality, and overall poor link performance including high latency, low throughput, and link failure.

Some techniques and apparatuses described herein enable reduced SRS interference by TD-OCC hopping. In some aspects, a UE 120 may be configured with an SRS resource for transmitting an SRS using TD-OCC hopping. The UE 120 may thus transmit the SRS using the SRS resource based at least in part on performing TD-OCC hopping. In some aspects, performing TD-OCC hopping may include the UE 120 selecting a TD-OCC sequence to be used in a given transmission occasion based at least in part on a pseudo-random sequence. For example, the UE 120 may select a TD-OCC sequence to be used based at least in part on a hopping formula that incorporates a pseudo-random sequence that is a function of at least one of time, a slot index within a frame, a symbol index within a slot, or the like. In some other aspects, the UE 120 may select a TD-OCC sequence to be used based at least in part on a hopping formula that does not incorporate a pseudo-random sequence but instead is based at least in part on a pre-configured list of TD-OCC sequences, or the like. In some aspects, the UE 120 may select a single TD-OCC sequence to be used for each port of an SRS transmission, while, in some other aspects, at least two SRS ports may utilize a different TD-OCC sequence in a given transmission occasion. As a result performing TD-OCC hopping associated with SRS transmissions, SRS capacity may be increased and SRS interference may be reduced as compared to only using group hopping, sequence hopping, frequency hopping, and similar techniques, leading to improved SRS reception and channel quality, including lower latency, higher throughput, and increased coverage.

As indicated above, FIG. 6 is provided as an example. Other examples may differ from what is described with regard to FIG. 6.

Figure 7A:
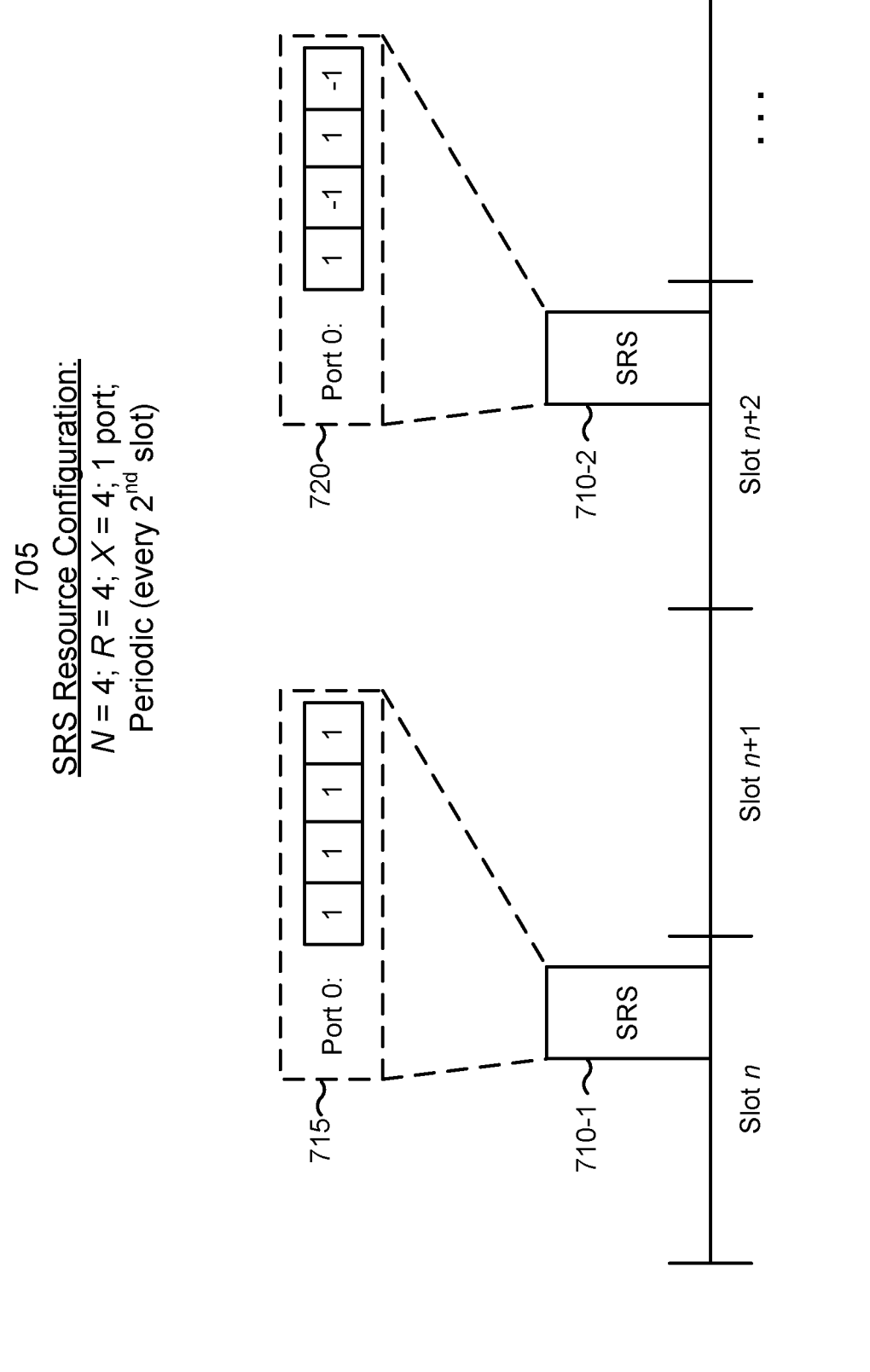
FIGS. 7A-7B are diagrams of an example associated with time domain orthogonal cover code (TD-OCC) hopping for SRS transmissions, in accordance with the present disclosure.
Figure 7B:
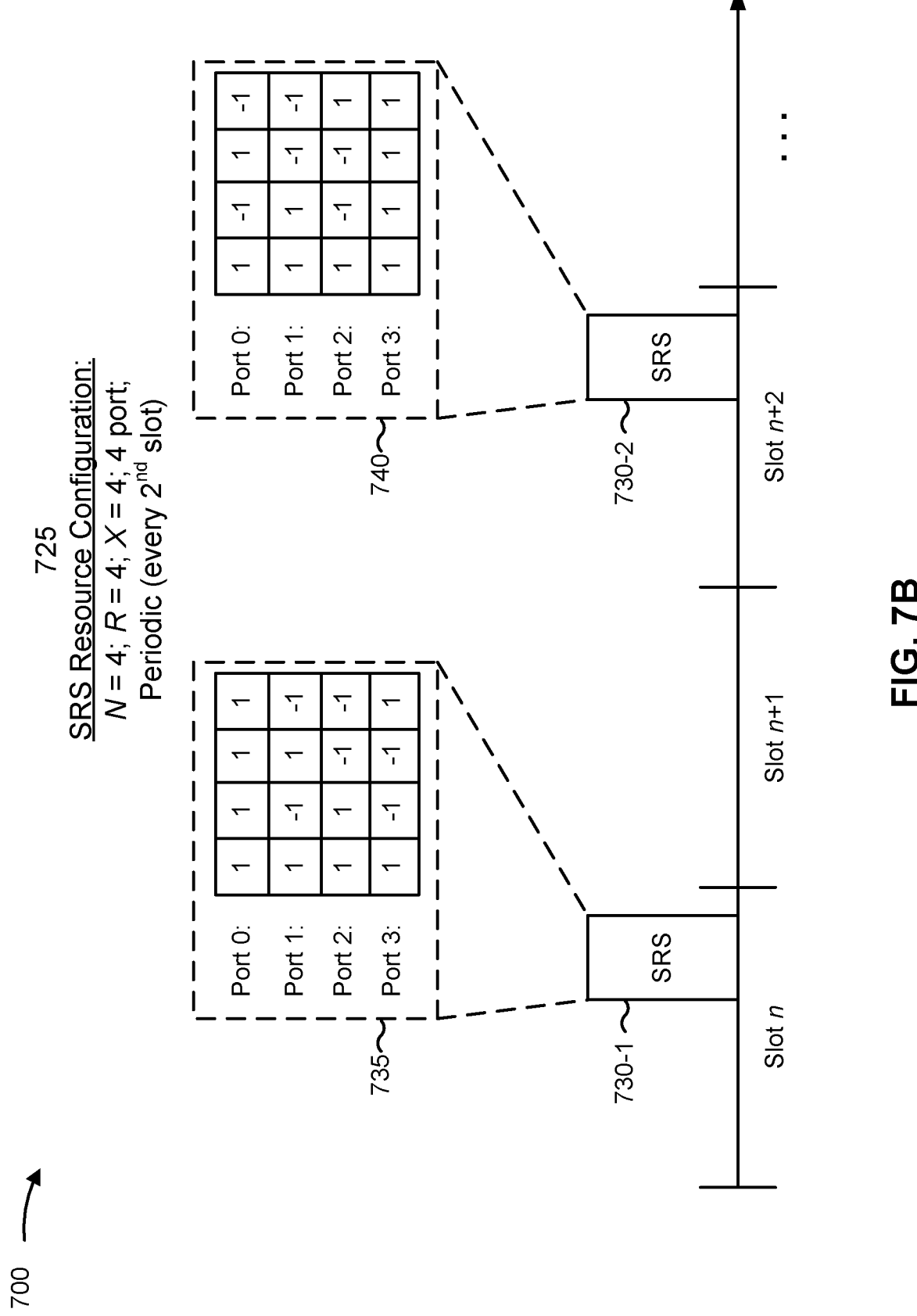

FIGS. 7A-7B are diagrams of an example 700 associated with TD-OCC hopping for SRS transmissions, in accordance with the present disclosure.

In some aspects, a UE 120 may be configured with an SRS resource with a TD-OCC of length X across X symbols, as described above in connection with FIG. 6. In some aspects, the UE 120 may be further configured to perform TD-OCC hopping, in which the UE 120 will vary a TD-OCC sequence used for transmission based at least in part on a hopping formula, or the like. Put another way, the UE 120 may hop from one TD-OCC sequence to another TD-OCC sequence when transmitting an SRS using a configured SRS resource according to a time-dependent hopping formula, or otherwise.

In a first example, as shown in FIG. 7A and as indicated by reference number 705, the UE 120 may receive an SRS resource configuration indicating that the UE 120 should transmit an SRS using four symbols (e.g., N=4) with a repetition factor of four (e.g., R=4, meaning that frequency hopping is not to be performed for this SRS configuration), that only one SRS port is to be used, and that the SRS resource is periodic, occurring every second slot. The SRS resource configuration may further indicate that the UE 120 should use TD-OCC with a TD-OCC length of four (e.g., X=4) when transmitting the SRS, and that the UE 120 should use TD-OCC hopping, meaning that the UE 120 should switch (or hop) between TD-OCC sequences when transmitting the SRS. For example, the SRS resource configuration may indicate that the UE 120 should switch TD-OCC sequences every SRS resource instance (e.g., every slot containing an SRS transmission).

In such aspects, the UE 120 may transmit a first instance of the SRS in a first SRS resource 710-1, which occurs in a first slot (e.g., slot n in the depicted example), the UE 120 may transmit a second instance of the SRS in a second SRS resource 710-2, which occurs in a second slot (e.g., slot n+2 in the depicted example), and the UE 120 may continue in a similar manner in subsequent slots (not shown). Moreover, because the UE 120 is configured to perform TD-OCC with a TD-OCC length of four as well as perform TD-OCC hopping, the UE 120 may orthogonalize the SRS in each SRS resource 710-1, 710-2 with respect to SRS transmissions from other UEs by utilizing a specific TD-OCC sequence for transmitting the SRS. For example, in the first slot (e.g., slot n), the UE 120 may transmit the SRS using a TD-OCC sequence of {1,1,1,1}, as indicated by reference number 715, and in the second slot (e.g., slot n+2), the UE 120 may transmit the SRS using a TD-OCC sequence of {1,−1,1,−1}, as indicated by reference number 720. The UE 120 may determine the specific TD-OCC sequence to apply (e.g., one of {1,1,1,1} or {1,−1,1,−1}) based at least in part on a hopping formula, which, in some aspects, may be based at least in part on a pseudo-random sequence with a certain initialization, which is described in more detail in connection with FIG. 8, below.

Although the example shown in FIG. 7A is a single-port SRS transmission, aspects of the disclosure are not so limited. In some other aspects, similar concepts may be applied to multi-port SRS transmissions. For example, FIG. 7B shows an example that includes a four-port SRS transmission. More particularly, as indicated by reference number 725, the UE 120 may receive an SRS resource configuration indicating that the UE 120 should transmit an SRS using four symbols (e.g., N=4) with a repetition factor of four (e.g., R=4, meaning that frequency hopping is not to be performed for this SRS configuration), that four SRS ports are to be used, and that the SRS resource is periodic, occurring every second slot. The SRS resource configuration may further indicate that the UE 120 should use TD-OCC with a TD-OCC length of four (e.g., X=4) when transmitting the SRS, and that the UE 120 should use TD-OCC hopping. For example, the SRS resource configuration may indicate that the UE 120 should switch TD-OCC sequences every SRS resource instance (e.g., every slot containing an SRS transmission).

In such aspects, the UE 120 may transmit a first instance of the SRS in a first SRS resource 730-1, which occurs in a first slot (e.g., slot n in the depicted example), the UE 120 may transmit a second instance of the SRS in a second SRS resource 730-2, which occurs in a second slot (e.g., slot n+2 in the depicted example), and the UE 120 may continue in a similar manner in subsequent slots (not shown). Moreover, because the UE 120 is configured to perform TD-OCC with a TD-OCC length of four as well as perform TD-OCC hopping, the UE 120 may orthogonalize the SRS ports in each SRS resource 730-1, 730-2 with respect to the SRS ports of the UE 120 or the SRS ports of the other UEs by utilizing a specific TD-OCC sequence for transmitting each port of the SRS transmission. For example, as indicated by reference number 735, in the first slot (e.g., slot n), the UE 120 may transmit a first port of the SRS (e.g., port 0) using a TD-OCC sequence of {1,1,1,1}, a second port of the SRS (e.g., port 1) using a TD-OCC sequence of {1,−1,1,−1}, a third port of the SRS (e.g., port 2) using a TD-OCC sequence of {1,1,−1,−1}, and a fourth port of the SRS (e.g., port 3) using a TD-OCC sequence of {1,−1,−1,1}. Moreover, as indicated by reference number 740, in the second slot (e.g., slot n+2), the UE 120 may transmit the first port of the SRS (e.g., port 0) using a TD-OCC sequence of {1,−1,1,−1}, the second port of the SRS (e.g., port 1) using a TD-OCC sequence of {1,1,−1,−1}, a third port of the SRS (e.g., port 2) using a TD-OCC sequence of {1,−1,−1,1}, and the fourth port of the SRS (e.g., port 3) using a TD-OCC sequence of {1,1,1,1}. The UE 120 may determine the specific TD-OCC sequence (e.g., one of {1,1,1,1}, {1,−1,1,−1}, {1,1,−1,−1}, or {1,−1,−1,1}) to apply to each port in each SRS resource instance based at least in part on a hopping formula, which, in some aspects, may be based at least in part on a pseudo-random sequence with a certain initialization, which is described in more detail in connection with FIG. 8, below. By performing TD-OCC hopping for SRS transmissions, such as described in connection with FIGS. 7A and 7B, the UE 120 may further orthogonalize SRS transmissions, resulting improved SRS reception and channel quality, including lower latency, higher throughput, and increased coverage. This may become more apparent with reference to FIG. 8, described below.

As indicated above, FIGS. 7A-7B are provided as an example. Other examples may differ from what is described with regard to FIGS. 7A-7B.

Figure 8:
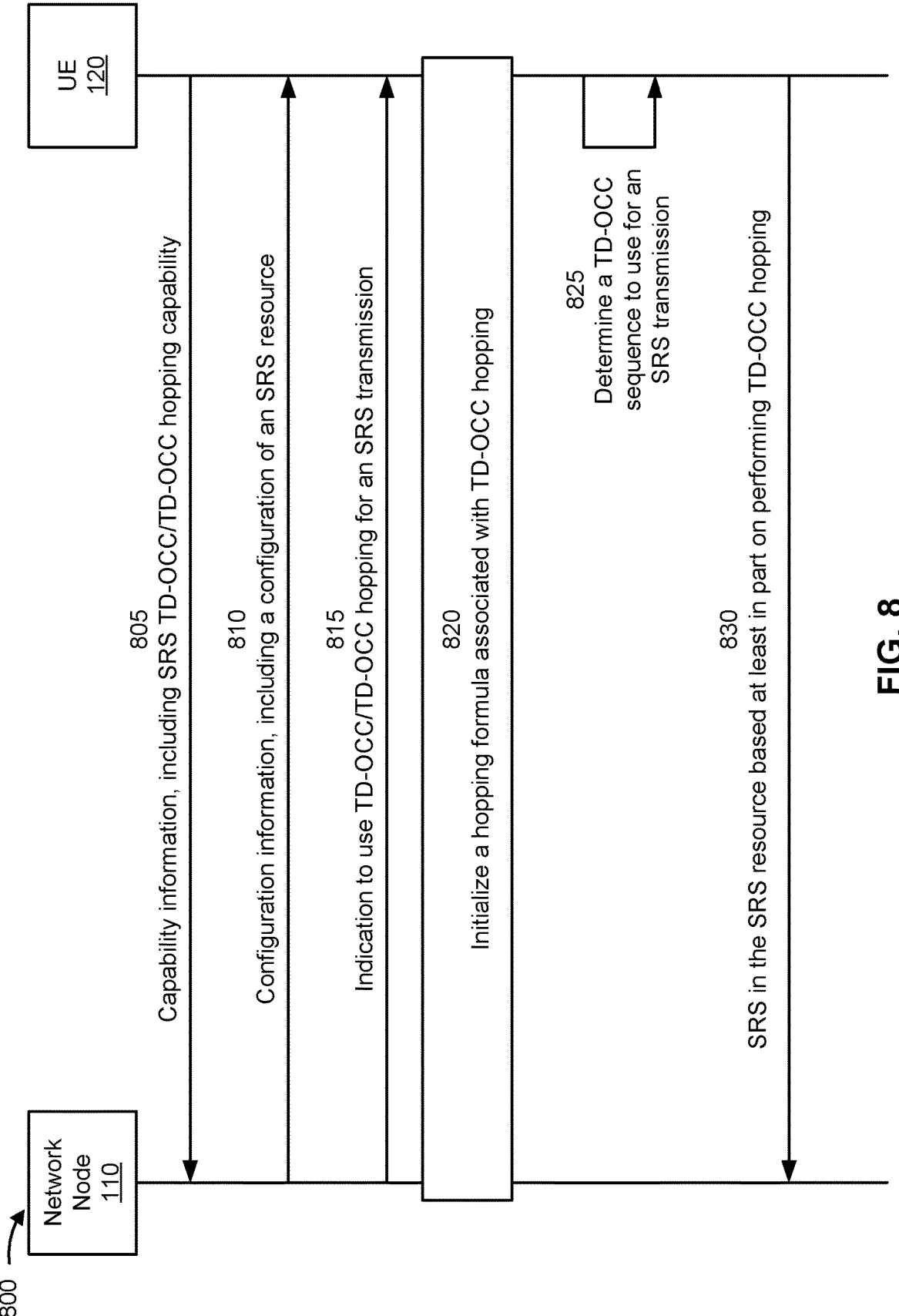
FIG. 8 is a diagram of another example associated with TD-OCC hopping for SRS transmissions, in accordance with the present disclosure.

FIG. 8 is a diagram of another example 800 associated with TD-OCC hopping for SRS transmissions, in accordance with the present disclosure. As shown in FIG. 8, a network node 110 may communicate with a UE 120. In some aspects, the network node 110 and the UE 120 may be part of a wireless network (e.g., wireless network 100). The UE 120 and the network node 110 may have established a wireless connection prior to operations shown in FIG. 8.

As shown by reference number 805, the UE 120 may transmit, and the network node 110 may receive, capability information. In some aspects, the capability information may indicate whether the UE 120 is capable of performing TD-OCC for SRS transmissions, and/or whether the UE 120 is capable of performing TD-OCC hopping for SRS transmissions. The UE 120 may indicate the capability information shown by reference number 805 using one or more feature group (FG) indicators (FGIs). For example, using a first FGI (sometimes referred to as FG X-1), the UE 120 may indicate support of SRS TD-OCC when SRS repetition is configured, such as for purposes of improving SRS capacity. Additionally, or alternatively, using a second FGI (sometimes referred to as FG X-2), the UE 120 may indicate support of SRS TD-OCC hopping when SRS repetition is configured, such as for purposes of improving SRS interference reduction.

As shown by reference number 810, the network node 110 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may include a configuration of an SRS resource. In some aspects, the configuration information may be associated with an SRS resource and/or an SRS resource set. That is, in some aspects, the configuration of the at least one SRS resource is associated with a single SRS resource (such as one of SRS Resource A or SRS resource B described in connection with FIG. 5), while in some other aspects, the configuration of the at least one SRS resource is associated with an SRS resource set including multiple SRS resources (such as one of SRS resource set 1 or SRS resource set 2 described in connection with FIG. 5). In some aspects, the configuration information may configure a hopping formula for determining a TD-OCC sequence to be used for an SRS transmission and/or may configure one or more parameters of a hopping formula, such as an initialization parameter or the like. Aspects of various hopping formulas that may be employed are described in more detail in connection with reference number 825.

The UE 120 may configure itself based at least in part on the configuration information. In some aspects, the UE 120 may be configured to perform one or more operations described herein based at least in part on the configuration information.

As shown by reference number 815, the UE 120 may receive, and the network node 110 may transmit, one or more indications indicating that an SRS associated with the SRS resource should be transmitted using a TD-OCC and/or that the UE should perform TD-OCC hopping when trans-mitting the SRS associated with the SRS resource. For example, based at least in part on the capability information described in connection with reference number 805, the network node 110 may determine that TD-OCC should be used for transmitting an SRS, such as for purposes of improving SRS capacity, or that TD-OCC hopping should be used when transmitting an SRS, such as for purposes of improving SRS interference reduction. In some aspects, the indication shown by reference number 815 may be included as part of the configuration information described in con-nection with reference number 810. For example, the indi-cation may be included in an RRC communication or a MAC-CE communication including the configuration infor-mation. In some other aspects, the indication shown by reference number 815 may be included as part of another configuration communication (e.g., a configuration commu-nication separate from the communication shown in con-nection with reference number 810), such as another RRC communication or another MAC-CE communication. In some other aspects, the indication shown by reference number 815 may be included as part of a DCI communica-tion.

In some aspects, the indication that the UE 120 should perform TD-OCC hopping when transmitting the SRS asso-ciated with the SRS resource is specific to an SRS resource (e.g., one of SRS resource A or SRS resource B described in connection with FIG. 5). In such aspects, the UE 120 may only perform TD-OCC hopping for SRS transmissions asso-ciated with the corresponding SRS resource (e.g., the one of SRS resource A or SRS resource B). In some other aspects, the indication that the UE 120 should perform TD-OCC hopping when transmitting the SRS associated with the SRS resource is specific to an SRS resource set (e.g., one of the SRS resource set 1 or SRS resource set 2 described in connection with FIG. 5). In such aspects, the UE 120 may only perform TD-OCC hopping for SRS transmissions asso-ciated with the corresponding SRS resource set (e.g., the one of SRS resource set 1 or SRS resource set 2). In some other aspects, the indication that the UE 120 should perform TD-OCC hopping when transmitting the SRS associated with the SRS resource is specific to at least one of a bandwidth part or a component carrier. In such aspects, the UE 120 may only perform TD-OCC hopping for SRS transmissions associated with the corresponding bandwidth part or component carrier. In some other aspects, the indi-cation that the UE 120 should perform TD-OCC hopping when transmitting the SRS associated with the SRS resource is specific to a subset of SRS ports associated with an SRS resource (e.g., a subset of antenna port 0, antenna port 1, antenna port 2, and/or antenna port 3 described in connec-tion with FIG. 5). In such aspects, the UE 120 may only perform TD-OCC hopping for SRS transmissions associated with the corresponding antenna ports of the subset.

Additionally, or alternatively, the indication that the UE 120 should perform TD-OCC hopping when transmitting the SRS associated with the SRS resource may be based at least in part on at least one of a time domain behavior of the SRS resource (e.g., whether the SRS resource is periodic, semi-persistent, or aperiodic) and/or a use case associated with the SRS resource (e.g., whether the SRS resource is used for purposes of a beam management use case, a codebook use case, a non-codebook use case, or an antenna switching use case). For example, the indication may indicate that the UE 120 should use TD-OCC hopping for periodic SRS resources and/or semi-persistent resources, but that the UE 120 should not use TD-OCC hopping for aperiodic SRS resources. Additionally, or alternatively, the indication may indicate that the UE 120 should use TD-OCC hopping for one use case (e.g., antenna switching) but not for other use cases (e.g., beam management).

As shown by reference number 820, in some aspects, the UE 120 and/or the network node 110 may utilize a hopping formula associated with SRS TD-OCC hopping. More par-ticularly, and as is described in more detail in connection with reference number 825, the UE 120 may select a TD-OCC sequence to use for a given SRS transmission based at least in part on a hopping formula, which, in some aspects, may be based at least in part at least in part of on a pseudo-random sequence (e.g., $c(\bullet)$) associated with the SRS transmission. Thus, in some aspects, the UE 120 and/or the network node 110 may initialize the hopping formula and/or the pseudo-random sequence. For example, the UE 120 and/or the network node 110 may initialize the hopping formula and/or the pseudo-random sequence at a beginning of each radio frame associated with an SRS transmission. Additionally, or alternatively, the UE 120 and/or the network node 110 may initialize the hopping formula and/or pseudo-random sequence prior to a first SRS transmission of mul-tiple repeating SRS transmissions (e.g., multiple periodic and/or semi-persistent SRS resources). For example, the UE 120 and/or the network node 110 may initialize the hopping formula and/or the pseudo-random sequence prior to any SRS transmissions associated with a periodic SRS resource, and the UE 120 may thereafter perform TD-OCC hopping using the periodic SRS resource without re-initializing the hopping formula and/or the pseudo-random sequence until the UE 120 receives a reconfiguration communication or the like from the network node 110 indicating that the pseudo-random sequence should be re-initialized.

In some aspects, when the hopping formula is based at least in part on the pseudo-random sequence, the pseudo-random sequence may be initialized based at least in part on an SRS sequence identity configured for the at least one SRS resource (e.g., $n_{ID}^{SRS}$ described in connection with FIG. 6). More particularly, the pseudo-random sequence may be initialized as $c_{init}$ at the beginning of each radio frame, prior to a first SRS transmission associated with an SRS resource, or the like, with $c_{init}=n_{ID}^{SRS}$. In some other aspects, the pseudo-random sequence may be initialized based at least in part on a parameter configured by the network node 110 (via RRC configuration or the like). For example, in some aspects, the UE 120 may receive, and the network node 110 may transmit, a configuration of a pseudo-random sequence initialization parameter (which may be different than the SRS sequence identify), and the pseudo-random sequence may be initialized based at least in part on the pseudo-random sequence initialization parameter. Beneficially, in such aspects, the pseudo-random sequence may be decoupled from the SRS sequence identity (e.g., $n_{ID}^{SRS}$), further randomizing SRS interference.

Moreover, in some aspects, a network node 110 may configure multiple UEs 120 with the same pseudo-random sequence initialization parameter when, for example, the UEs 120 are far from each other, such that they do not create interference to each other's intended receiver, and/or when the configured SRS parameters at each UE 120 (e.g., $K_{TC}$, $n_{SRS}^{cs}$, $n_{ID}^{SRS}$, u, v, groupOrSequenceHopping, or the like) may result in orthogonalization. In some aspects, a network node 110 may configure different UEs 120 with different pseudo-random sequence initialization parameters when, for example, the UEs 120 are close to each other, such that they may otherwise create interference to each other's intended receiver, and/or when the configured SRS parameters at each UE 120 (e.g., $K_{TC}$, $n_{SRS}^{cs}$, $n_{ID}^{SRS}$, u, v, groupOrSequence-Hopping, or the like) may not otherwise result in orthogonalization. Put another way, if two UEs 120 have the same pseudo-random sequence initialization parameter, then at a given time both UEs 120 may transmit an SRS using the same TD-OCC sequence. Thus, a network node 110 may only configure two UEs 120 with the same pseudo-random sequence initialization parameter if the UEs' 120 SRS transmissions do not create interference and/or if the UEs' 120 SRS transmissions are orthogonal.

As shown by reference number 825, the UE 120 may determine a TD-OCC sequence to apply to a given SRS transmission based at least in part on a hopping formula, or the like. In some aspects, the hopping formula may be referred to as $f_{TD-OCC,hopping}$. In some aspects, the hopping formula may be based at least in part on a pseudo-random sequence, as described above. In such aspects, the pseudo-random sequence may be used to generate a pseudo-random number, which may correspond to a selected TD-OCC sequence for transmission. The pseudo-random number may be a function of time, and, more particularly, a function of a slot number within radio frame having subcarrier spacing of $\mu$ (e.g., $n_{s,f}^{\mu}$), and/or an initial symbol associated with the configured TD-OCC hopping granularity (e.g., $l_0$). More particularly, in some aspects, the pseudo-random number (and thus the TD-OCC sequence to be used) may be determined according to the hopping formula $f_{TD-OCC,hopping}$ $(n_{s,f}^{\mu}, l_0) = (\sum_{m=0}^{M-1} c(M \cdot (n_{s,f}^{\mu} N_{symb}^{slot} + l_0) + m) \cdot 2^m)$ mod Y, in which M corresponds to the number of elements of the pseudo-random sequence that are used; c corresponds to the pseudo-random sequence; $n_{s,f}^{\mu}$ corresponds to the slot number within radio frame having subcarrier spacing of $\mu$, as described; $N_{symb}^{slot}$ corresponds to the number of symbols within the slot (e.g., fourteen); Y corresponds to the number of TD-OCC sequences available to select from; and $l_0$ corresponding to the initial symbol associated with the configured TD-OCC hopping granularity, described in more detail below. Moreover, in some aspects, the network node 110 may configure (e.g., via an RRC communication) the UE 120 with an initial TD-OCC sequences index, sometimes referred to as y0. Put another way, y0 may be an element of the list $(0,1, \ldots, Y-1)$. In such aspects, a particular TD-OCC sequence to use in a given transmission occasion (sometimes referred to as y) may be determined according to the formula: $y = (y_0 + f_{TD-OCC,hopping})$ mod Y.

In some aspects, a UE 120 may be configured to apply the same TD-OCC sequence to all symbols within an SRS resource instance (e.g., a slot). Put another way, the UE 120 may be configured to apply the same TD-OCC sequence to all symbols within a given SRS resource and/or slot, and then hop to another TD-OCC sequence for the next SRS resource instance and/or slot. In such aspects, the TD-OCC sequence may not be changed within the SRS resource instance even if the TD-OCC length (e.g., X) is shorter than the number SRS symbols within the SRS resource instance (e.g., the TD-OCC sequence is not changed even if N is greater than X). Moreover, in such aspects, $l_0$ may correspond to the first symbol of the SRS resource within a slot.

In some other aspects, a UE 120 may be configured to change TD-OCC sequences with each frequency hop. That is, the UE 120 may be configured to apply one TD-OCC sequence to all symbols associated with a first frequency hop, the UE 120 may be configured to apply another TD-OCC sequence to all symbols associated with a second frequency hop, and so forth. Put another way, one TD-OCC sequence is selected for each R consecutive symbols of an SRS resource instance that are mapped to a frequency hop. In such aspects, the TD-OCC sequence may not be changed within the frequency hop even if the TD-OCC length (e.g., X) is shorter than the number SRS symbols within the frequency hop (e.g., the TD-OCC sequence is not changed even if R is greater than X). In such aspects, $l_0$ may correspond to the first symbol of a frequency hop within a slot.

In some other aspects, a UE 120 may be configured to change TD-OCC sequences after each TD-OCC block. That is, the UE 120 may be configured to apply a first TD-OCC sequence to a first number of symbols equaling a length of the TD-OCC sequence (e.g., X), the UE 120 may be configured to apply a second TD-OCC sequence to a second number of symbols equaling a length of the TD-OCC sequence, and so forth. Put another way, one TD-OCC sequence out of Y sequences is chosen in each X consecutive symbols of an SRS resource that are mapped to a TD-OCC block, and thus if an SRS resource instance includes multiple blocks of X symbols, the TD-OCC sequence is changed across different blocks. In such aspects, to may correspond to the first symbol of a TD-OCC block within a slot.

As an example, an SRS resource may be configured to include eight symbols (e.g., X=8), a repetition factor of four (e.g., R=4, meaning that each SRS resource instance will include two frequency hops, each having a length of four consecutive symbols), a TD-OCC length of 2 (e.g., X=2, meaning that each SRS instance will include four TD-OCC blocks, each having a length of two consecutive symbols), and with two TD-OCC sequences to choose from (e.g., Y=2, and, more particularly, with the selected TD-OCC sequence being either {1,1} or {1,−1}). In such aspects, TD-OCC is applied to two consecutive symbols (e.g., X=2) and, because there are eight SRS symbols per SRS resource, there are four TD-OCC blocks within each SRS resource (e.g., there are NIX TD-OCC blocks, or, in this example, 8/2=4 TD-OCC blocks within the SRS resource).

In such an example, if the UE 120 is configured to apply the same TD-OCC sequence to all symbols within an SRS resource instance (e.g., if the UE 120 is configured to TD-OCC hop after each SRS instance), all four TD-OCC blocks within the SRS resource (and thus all eight SRS symbols) are associated with the same TD-OCC sequence, and $l_0$ corresponds to the first symbol of the SRS resource within the slot. However, if the UE 120 is configured to apply the same TD-OCC sequence to all symbols within a frequency hop (e.g., if the UE 120 is configured to TD-OCC hop after each frequency hop), the first two of the four TD-OCC blocks within the SRS resource (e.g., the first four SRS symbols) are associated with a first TD-OCC sequence, and the second two of the four TD-OCC blocks within the SRS resource (e.g., the last four SRS symbols) are associated with a second TD-OCC sequence, which may be different from the first TD-OCC sequence. In this example, $l_0$ corresponds to the first symbol of the corresponding frequency hop within the slot. And if the UE 120 is configured to apply the same TD-OCC sequence to all symbols within a TD-OCC block (e.g., if the UE 120 is configured to TD-OCC hop after each TD-OCC block), the first of the four TD-OCC blocks within the SRS resource (e.g., the first two SRS symbols) is associated with a first TD-OCC sequence, the second of the four TD-OCC blocks within the SRS resource (e.g., the second two SRS symbols) is associated with a second TD-OCC sequence (which may be different from the first TD-OCC sequence), the third of the four TD-OCC blocks within the SRS resource (e.g., the third two SRS symbols) is associated with a third TD-OCC sequence (which may be different from the first TD-OCC sequence and/or the second TD-OCC sequence), and the fourth of the four TD-OCC blocks within the SRS resource (e.g., the last two SRS symbols) is associated with a fourth TD-OCC sequence (which may be different from the first TD-OCC sequence, the second TD-OCC sequence, and/or the third TD-OCC sequence). In this example, $l_0$ corresponds to the first symbol of the corresponding TD-OCC block within the slot.

In some aspects, the hopping formula may not be based on a pseudo-random sequence. For example, the hopping formula may be associated with a pre-defined sequence, such as a pre-defined sequence associated with one of a sequential selection process or a bit-reversal process. More particularly, in a bit-reversal process, the UE 120 may be configured to reverse one or more bits of a TD-OCC sequence between SRS transmission occasions (e.g., between each SRS resource, frequency hop, or TD-OCC block, depending on the TD-OCC hopping granularity) to derive a new TD-OCC sequence to be applied. For example, the UE 120 may be configured to reverse a second and third bit of a TD-OCC sequence, such that the UE 120 may alternatingly use TD-OCC sequences of $\{1,1,1,1\}$ and $\{1,-1,-1,1\}$ in alternating SRS transmission occasions.

In a sequential selection process, the UE 120 may be configured with a sequential list of TD-OCC sequences, and the UE 120 may select one of the TD-OCC sequences according to an SRS transmission occasion, or the like. For example, when a TD-OCC process is associated with four TD-OCC sequences (e.g., Y=4), indexed as TD-OCC 0, TD-OCC 1, TD-OCC 2, and TD-OCC 3, the UE 120 may be configured to apply the sequences in a configured order, such as {TD-OCC 0, TD-OCC 1, TD-OCC 2, TD-OCC 3}, {TD-OCC 0, TD-OCC 2, TD-OCC 1, and TD-OCC 3}, or the like.

In such aspects, when the UE 120 is configured to change TD-OCC sequences with each SRS resource (e.g., with each slot), the UE 120 may apply a first TD-OCC sequence from the sequential list in a first SRS resource, a second TD-OCC sequence from the sequential list in a second SRS resource, a third TD-OCC sequence from the sequential list in a third SRS resource, and so forth. When the UE 120 is configured to change TD-OCC sequences with each frequency hop, the UE 120 may apply a first TD-OCC sequence from the sequential list in a first frequency hop, a second TD-OCC sequence from the sequential list in a second frequency hop, a third TD-OCC sequence from the sequential list in a third frequency hop, and so forth. And when the UE 120 is configured to change TD-OCC sequences with TD-OCC block, the UE 120 may apply a first TD-OCC sequence from the sequential list in a first TD-OCC block, a second TD-OCC sequence from the sequential list in a second TD-OCC block, a third TD-OCC sequence from the sequential list in a third TD-OCC block, and so forth. More generally, the UE 120 may determine an index of a TD-OCC sequence from the sequential list to be utilized in each SRS transmission occasion (e.g., in each SRS resource, frequency hop, or TD-OCC block, depending on the TD-OCC hopping granularity) based at least in part on the equation $y=(y_0+f_{TD\text{-}OCC,hopping})$ mod Y.

In some aspects, an SRS resource may be configured with multiple SRS ports, as described in connection with FIG. 5. In such aspects, in connection with the determination indicated by reference number 825, the UE 120 may determine a TD-OCC sequence associated with each SRS port. In some aspects, the UE 120 may determine a first TD-OCC sequence associated with a first SRS port according to a hopping formula (e.g., $f_{TF\text{-}OCC,hopping}(n_{s,f}^{\mu}, l_0)=(\Sigma_{m=0}^{M-1} c(M\cdot(n_{s,f}^{\mu}N_{symb}^{slot}+l_0)+m)\cdot 2^m)$ mod Y, or else a non-pseudo-random sequence hopping formula, as described above), and may determine a second TD-OCC sequence associated with a second SRS port based at least in part on the first TD-OCC sequence. For example, the UE 120 may determine the first TD-OCC sequence associated with the first SRS port according to a hopping formula, and the UE 120 may determine the second TD-OCC sequence associated with the second SRS port based at least in part on applying a hopping offset to the first TD-OCC sequence. In some aspects, the hopping offset may be RRC configured, and/or the hoping offset may be indicated to the UE 120 via the configuration information described in connection with reference number 810 and/or the one or more indications described in connection with reference number 815.

For example, an SRS resource may be associated with two SRS ports, a TD-OCC of length 4 (e.g., X=4); four TD-OCC sequences (e.g., Y=4), such as $\{1,1,1,1\}$, $\{1,-1,1,-1\}$, $\{1,1,-1,-1\}$, and $\{1,-1,-1,1\}$, with TD-OCC sequence indices of 0, 1, 2, 3; and a hopping offset (sometimes referred to as $Offset_{TD\text{-}OCC}$) of 3. In such aspects, the UE 120 may determine a first TD-OCC sequence index associated with the first SRS port (sometimes referred to as $TD\text{-}OCC_{Port0}$) by using a hopping formula, such as one of the hopping formulas described above. For example, the hopping formula may indicate that the TD-OCC sequence indexed as 2 (e.g., $\{1,1,-1,-1\}$) should be used for the first SRS port. The UE 120 may determine a second TD-OCC sequence associated with the second SRS port according to the formula $(TD\text{-}OCC_{Port0}+Offset_{TD\text{-}OCC})$ modY. In this example, the UE 120 may thus determine that TD-OCC sequence indexed as 1 (e.g., $\{1,-1,1,-1\}$) should be used for the second SRS port, because (2+3) mod4=1.

In some other aspects, the same TD-OCC sequence may be applied to all SRS ports of the SRS resource. Returning to the above example, the UE 120 may determine a first TD-OCC sequence index associated with the first SRS port by using a hopping formula, such as one of the hopping formulas described above. For example, the hopping formula may indicate that the TD-OCC sequence indexed as 2 (e.g., $\{1,1,-1,-1\}$) should be used for the first SRS port. In this example, the UE 120 may determine a second TD-OCC sequence index associated with the second SRS port, which will be the same as the first TD-OCC sequence (e.g., the TD-OCC sequence indexed as 2). In such aspects, although different TD-OCC sequences may not be used across SRS ports of an SRS resource, different TD-OCC sequences may nonetheless be used across different UEs and/or different SRS resources. Moreover, within a given SRS resource, different SRS ports may nonetheless be orthogonalized by using different cyclic shifts, comb offsets, or the like.

In some other aspects, a hopping formula may be a function of SRS port number, in addition to being a function of time. In such aspects, the UE 120 may separately determine a TD-OCC sequence to be used for each SRS port of an SRS resource. In such aspects, it may be possible for more than one SRS port of an SRS resource to be associated with the same TD-OCC sequence. Accordingly, in some aspects, different TD-OCC sequences may be used across different UEs and/or SRS resources, and, in a given SRS resource, different SRS ports may further be orthogonalized by using different cyclic shifts, different comb offsets, or the like.

As shown by reference number 830, the UE 120 may transmit the SRS using the at least one SRS resource based at least in part on performing TD-OCC hopping. More particularly, the UE 120 may transmit an SRS using a differently determined TD-OCC sequence for each SRS transmission occasion (e.g., each SRS resource, each frequency hop, or each TD-OCC block, depending on the TD-OCC hopping granularity) based at least in part on a hopping formula or the like, as described above. As a result of implementing TD-OCC hopping for SRS transmissions, SRS capacity may be increased and/or SRS interference may be reduced as compared to only group hopping, sequence hopping, and similar techniques, as discussed. Increasing SRS capacity and/or reducing SRS interference may conserve computing, power, network, and/or communication resources that may have otherwise been consumed retransmitting SRS transmissions and/or communicating based on incomplete SRS information. For example, based at least in part on the UE 120 performing TD-OCC hopping for SRS transmissions, the UE 120 and the network node 110 may communicate with a reduced error rate, which may conserve computing, power, network, and/or communication resources that may have otherwise been consumed to detect and/or correct communication errors.

As indicated above, FIG. 8 is provided as an example. Other examples may differ from what is described with respect to FIG. 8.

FIG. 9 is a diagram illustrating an example process 900 performed, for example, by a UE, in accordance with the present disclosure. Example process 900 is an example where the UE (e.g., UE 120) performs operations associated with TD-OCC for SRS transmissions.

As shown in FIG. 9, in some aspects, process 900 may include receiving a configuration of an SRS resource (block 910). For example, the UE (e.g., using communication manager 140 and/or reception component 1102, depicted in FIG. 11) may receive a configuration of an SRS resource, as described above.

As further shown in FIG. 9, in some aspects, process 900 may include receiving one or more indications indicating that an SRS associated with the SRS resource should be transmitted using a TD-OCC and that the UE should perform TD-OCC hopping when transmitting the SRS associated with the SRS resource (block 920). For example, the UE (e.g., using communication manager 140 and/or reception component 1102, depicted in FIG. 11) may receive one or more indications indicating that an SRS associated with the SRS resource should be transmitted using a TD-OCC and that the UE should perform TD-OCC hopping when transmitting the SRS associated with the SRS resource, as described above.

As further shown in FIG. 9, in some aspects, process 900 may include transmitting the SRS using the SRS resource based at least in part on the configuration of the SRS resource and by performing the TD-OCC hopping (block 930). For example, the UE (e.g., using communication manager 140, transmission component 1104, and/or TD-OCC component 1108, depicted in FIG. 11) may transmit the SRS using the SRS resource based at least in part on the configuration of the SRS resource and by performing the TD-OCC hopping, as described above.

Process 900 may include additional aspects, such as any single aspect or any combination of aspects described below and/or in connection with one or more other processes described elsewhere herein.

In a first aspect, process 900 includes receiving an indication of an initial TD-OCC sequence associated with performing the TD-OCC hopping.

In a second aspect, alone or in combination with the first aspect, performing the TD-OCC hopping includes switching TD-OCC sequences after each instance of the SRS resource.

In a third aspect, alone or in combination with one or more of the first and second aspects, performing the TD-OCC hopping includes switching TD-OCC sequences after each frequency hop associated with the SRS resource.

In a fourth aspect, alone or in combination with one or more of the first through third aspects, performing the TD-OCC hopping includes switching TD-OCC sequences after a number of symbols associated with the SRS resource.

In a fifth aspect, alone or in combination with one or more of the first through fourth aspects, the number of symbols associated with the SRS resource corresponds to a TD-OCC length.

In a sixth aspect, alone or in combination with one or more of the first through fifth aspects, performing the TD-OCC hopping includes selecting a TD-OCC sequence based at least in part on a hopping formula.

In a seventh aspect, alone or in combination with one or more of the first through sixth aspects, the hopping formula is associated with a pseudo-random sequence.

In an eighth aspect, alone or in combination with one or more of the first through seventh aspects, the pseudo-random sequence is initialized at a beginning of each radio frame based at least in part on an SRS sequence identity configured for the SRS resource.

In a ninth aspect, alone or in combination with one or more of the first through eighth aspects, the pseudo-random sequence is initialized at a beginning of each radio frame based at least in part on a configured pseudo-random sequence initialization parameter.

In a tenth aspect, alone or in combination with one or more of the first through ninth aspects, the hopping formula is a function of time.

In an eleventh aspect, alone or in combination with one or more of the first through tenth aspects, the hopping formula is based at least in part on at least one of a slot index within a frame, a first symbol index of the SRS resource within a slot, a first symbol index of a frequency hop within the slot, or a first symbol index of a TD-OCC block within a slot.

In a twelfth aspect, alone or in combination with one or more of the first through eleventh aspects, performing the TD-OCC hopping includes selecting a TD-OCC sequence based at least in part on a hopping formula associated with a pre-defined sequence.

In a thirteenth aspect, alone or in combination with one or more of the first through twelfth aspects, the pre-defined sequence is associated with one of a sequential selection process or a bit-reversal process.

In a fourteenth aspect, alone or in combination with one or more of the first through thirteenth aspects, the SRS resource is associated with multiple SRS ports, and the TD-OCC sequence is associated with a first SRS port, of the multiple SRS ports.

In a fifteenth aspect, alone or in combination with one or more of the first through fourteenth aspects, performing the TD-OCC hopping includes selecting another TD-OCC sequence associated with a second SRS port, of the multiple SRS ports, based at least in part on a hopping offset.

In a sixteenth aspect, alone or in combination with one or more of the first through fifteenth aspects, performing the TD-OCC hopping includes using the TD-OCC sequence for a second SRS port, of the multiple SRS ports.

In a seventeenth aspect, alone or in combination with one or more of the first through sixteenth aspects, the hopping formula is based at least in part on an SRS port number.

In an eighteenth aspect, alone or in combination with one or more of the first through seventeenth aspects, the one or more indications indicating that the SRS associated with the SRS resource should be transmitted using the TD-OCC and that the UE should perform TD-OCC hopping when transmitting the SRS associated with the SRS resource is specific to one of the SRS resource, an SRS resource set associated with the SRS resource, at least one of a bandwidth part or a component carrier associated with the SRS resource, or a subset of one or more SRS ports associated with the SRS resource.

In a nineteenth aspect, alone or in combination with one or more of the first through eighteenth aspects, the one or more indications indicating that the SRS associated with the SRS resource should be transmitted using the TD-OCC and that the UE should perform TD-OCC hopping when transmitting the SRS associated with the SRS resource is received via one of a radio resource control communication, a MAC-CE communication, or a downlink control information communication.

In a twentieth aspect, alone or in combination with one or more of the first through nineteenth aspects, the one or more indications indicating that the SRS associated with the SRS resource should be transmitted using the TD-OCC and that the UE should perform TD-OCC hopping when transmitting the SRS associated with the SRS resource is based at least in part on at least one of a time domain behavior of the SRS resource, or a use case associated with the SRS resource.

In a twenty-first aspect, alone or in combination with one or more of the first through twentieth aspects, process 900 includes transmitting capability information, wherein the capability information includes at least one of an indication of whether the UE supports TD-OCC for SRS transmissions, or an indication of whether the UE supports TD-OCC hopping for SRS transmissions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a network node, in accordance with the present disclosure. Example process 1000 is an example where the network node (e.g., network node 110) performs operations associated with TD-OCC for SRS transmissions.

As shown in FIG. 10, in some aspects, process 1000 may include transmitting, to a UE (e.g., UE 120), a configuration of an SRS resource (block 1010). For example, the network node (e.g., using communication manager 150, transmission component 1204, and/or configuration component 1208 depicted in FIG. 12) may transmit, to a UE, a configuration of an SRS resource, as described above.

As further shown in FIG. 10, in some aspects, process 1000 may include transmitting, to the UE, one or more indications indicating that an SRS associated with the SRS resource should be transmitted using a TD-OCC and that the UE should perform TD-OCC hopping when transmitting the SRS associated with the SRS resource (block 1020). For example, the network node (e.g., using communication manager 150, transmission component 1204, and/or configuration component 1208 depicted in FIG. 12) may transmit, to the UE, one or more indications indicating that an SRS associated with the SRS resource should be transmitted using a TD-OCC and that the UE should perform TD-OCC hopping when transmitting the SRS associated with the SRS resource, as described above.

As further shown in FIG. 10, in some aspects, process 1000 may include receiving, from the UE, the SRS using the SRS resource based at least in part on the configuration of the SRS resource and the TD-OCC hopping (block 1030). For example, the network node (e.g., using communication manager 150 and/or reception component 1202, depicted in FIG. 12) may receive, from the UE, the SRS using the SRS resource based at least in part on the configuration of the SRS resource and the TD-OCC hopping, as described above.

Process 1000 may include additional aspects, such as any single aspect or any combination of aspects described below and/or in connection with one or more other processes described elsewhere herein.

In a first aspect, process 1000 includes transmitting, to the UE, an indication of an initial TD-OCC sequence associated with the TD-OCC hopping.

In a second aspect, alone or in combination with the first aspect, the TD-OCC hopping is associated with switching TD-OCC sequences after each instance of the SRS resource.

In a third aspect, alone or in combination with one or more of the first and second aspects, the TD-OCC hopping is associated with switching TD-OCC sequences after each frequency hop associated with the SRS resource.

In a fourth aspect, alone or in combination with one or more of the first through third aspects, the TD-OCC hopping is associated with switching TD-OCC sequences after a number of symbols associated with the SRS resource.

In a fifth aspect, alone or in combination with one or more of the first through fourth aspects, the number of symbols associated with the SRS resource corresponds to a TD-OCC length.

In a sixth aspect, alone or in combination with one or more of the first through fifth aspects, the TD-OCC hopping is associated with selecting a TD-OCC sequence based at least in part on a hopping formula.

In a seventh aspect, alone or in combination with one or more of the first through sixth aspects, the hopping formula is associated with a pseudo-random sequence.

In an eighth aspect, alone or in combination with one or more of the first through seventh aspects, the pseudo-random sequence is initialized at a beginning of each radio frame based at least in part on an SRS sequence identity configured for the SRS resource.

In a ninth aspect, alone or in combination with one or more of the first through eighth aspects, the pseudo-random sequence is initialized at a beginning of each radio frame based at least in part on a configured pseudo-random sequence initialization parameter.

In a tenth aspect, alone or in combination with one or more of the first through ninth aspects, the hopping formula is a function of time.

In an eleventh aspect, alone or in combination with one or more of the first through tenth aspects, the hopping formula is based at least in part on at least one of a slot index within a frame, a first symbol index of the SRS resource within a slot, a first symbol index of a frequency hop within the slot, or a first symbol index of a TD-OCC block within a slot.

In a twelfth aspect, alone or in combination with one or more of the first through eleventh aspects, the TD-OCC hopping is associated with selecting a TD-OCC sequence based at least in part on a hopping formula associated with a pre-defined sequence.

In a thirteenth aspect, alone or in combination with one or more of the first through twelfth aspects, the pre-defined sequence is associated with one of a sequential selection process or a bit-reversal process.

In a fourteenth aspect, alone or in combination with one or more of the first through thirteenth aspects, the SRS resource is associated with multiple SRS ports, wherein the TD-OCC sequence is associated with a first SRS port, of the multiple SRS ports.

In a fifteenth aspect, alone or in combination with one or more of the first through fourteenth aspects, the TD-OCC hopping is associated with selecting another TD-OCC sequence associated with a second SRS port, of the multiple SRS ports, based at least in part on a hopping offset.

In a sixteenth aspect, alone or in combination with one or more of the first through fifteenth aspects, the TD-OCC hopping is associated with using the TD-OCC sequence for a second SRS port, of the multiple SRS ports.

In a seventeenth aspect, alone or in combination with one or more of the first through sixteenth aspects, the hopping formula is based at least in part on an SRS port number.

In an eighteenth aspect, alone or in combination with one or more of the first through seventeenth aspects, the one or more indications indicating that the SRS associated with the SRS resource should be transmitted using the TD-OCC and that the UE should perform TD-OCC hopping when transmitting the SRS associated with the SRS resource is specific to one of the SRS resource, an SRS resource set associated with the SRS resource, at least one of a bandwidth part or a component carrier associated with the SRS resource, or a subset of one or more SRS ports associated with the SRS resource.

In a nineteenth aspect, alone or in combination with one or more of the first through eighteenth aspects, the one or more indications indicating that the SRS associated with the SRS resource should be transmitted using the TD-OCC and that the UE should perform TD-OCC hopping when transmitting the SRS associated with the SRS resource is transmitted via one of a radio resource control communication, a MAC-CE communication, or a downlink control information communication.

In a twentieth aspect, alone or in combination with one or more of the first through nineteenth aspects, the one or more indications indicating that the SRS associated with the SRS resource should be transmitted using the TD-OCC and that the UE should perform TD-OCC hopping when transmitting the SRS associated with the SRS resource is based at least in part on at least one of a time domain behavior of the SRS resource, or a use case associated with the SRS resource.

In a twenty-first aspect, alone or in combination with one or more of the first through twentieth aspects, process 1000 includes receiving, from the UE, capability information, wherein the capability information includes at least one of an indication of whether the UE supports TD-OCC for SRS transmissions, or an indication of whether the UE supports TD-OCC hopping for SRS transmissions.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
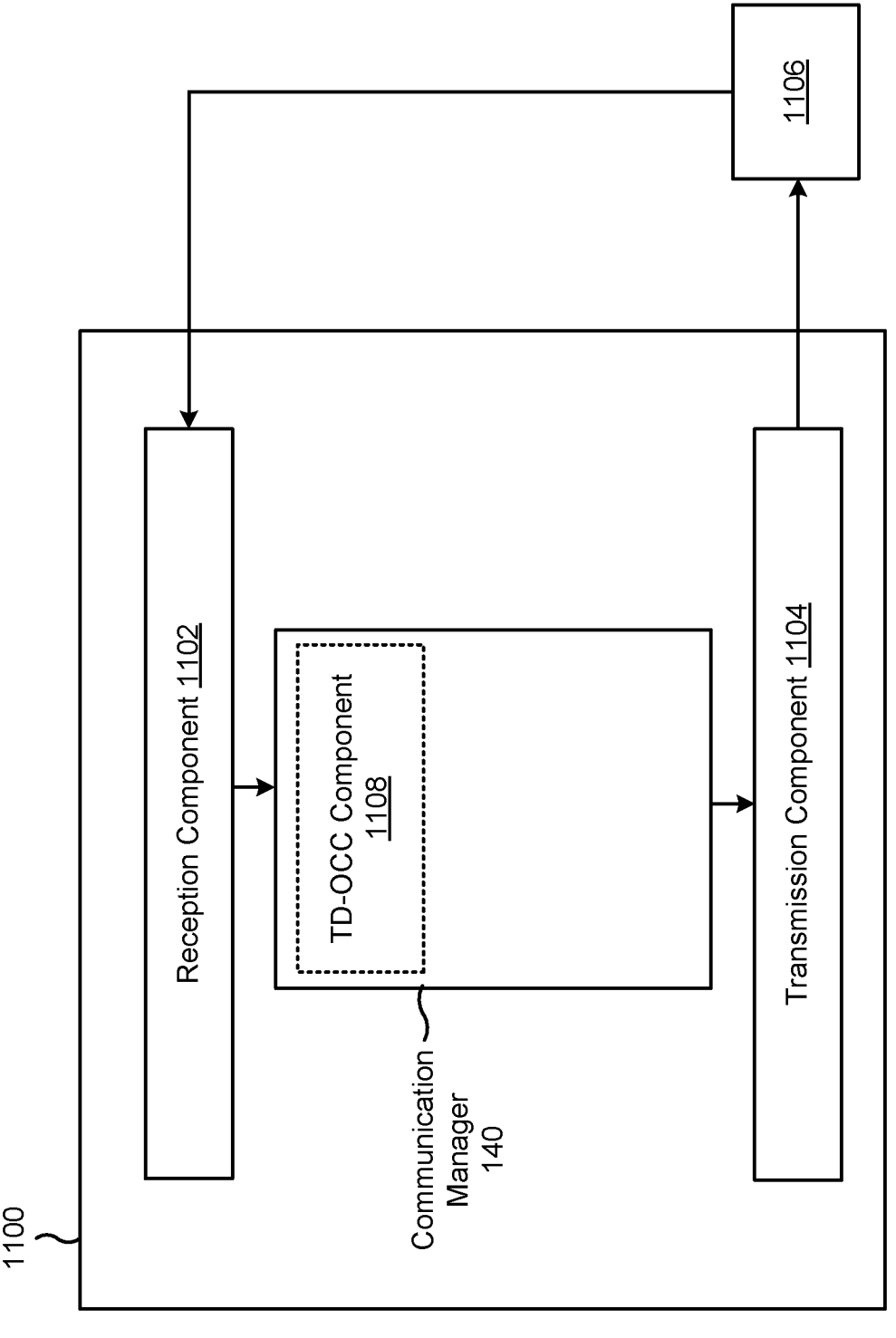
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (e.g., UE 120), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE 120, a network node 110, or another wireless communication device) using the reception component 1102 and the transmission component 1104. As further shown, the apparatus 1100 may include the communication manager 140. The communication manager 140 may include a TD-OCC component 1108, among other examples.

In some aspects, the apparatus 1100 may be configured to perform one or more operations described herein in connection with FIGS. 7A-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE 120 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE 120 described in connection with FIG. 2. In some aspects, the transmission component 1104 may be co-located with the reception component 1102 in a transceiver.

The reception component 1102 may receive a configuration of and SRS resource. The reception component 1102 may receive one or more indications indicating that an SRS associated with the SRS resource should be transmitted using a TD-OCC and that the UE should perform TD-OCC hopping when transmitting the SRS associated with the SRS resource. The transmission component 1104 and/or the TD-OCC component 1108 may transmit the SRS using the SRS resource based at least in part on the configuration of the SRS resource and by performing the TD-OCC hopping.

The reception component 1102 may receive an indication of an initial TD-OCC sequence associated with performing the TD-OCC hopping.

The transmission component 1104 and/or the TD-OCC component 1108 may transmit capability information, wherein the capability information includes at least one of an indication of whether the UE supports TD-OCC for SRS transmissions, or an indication of whether the UE supports TD-OCC hopping for SRS transmissions.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
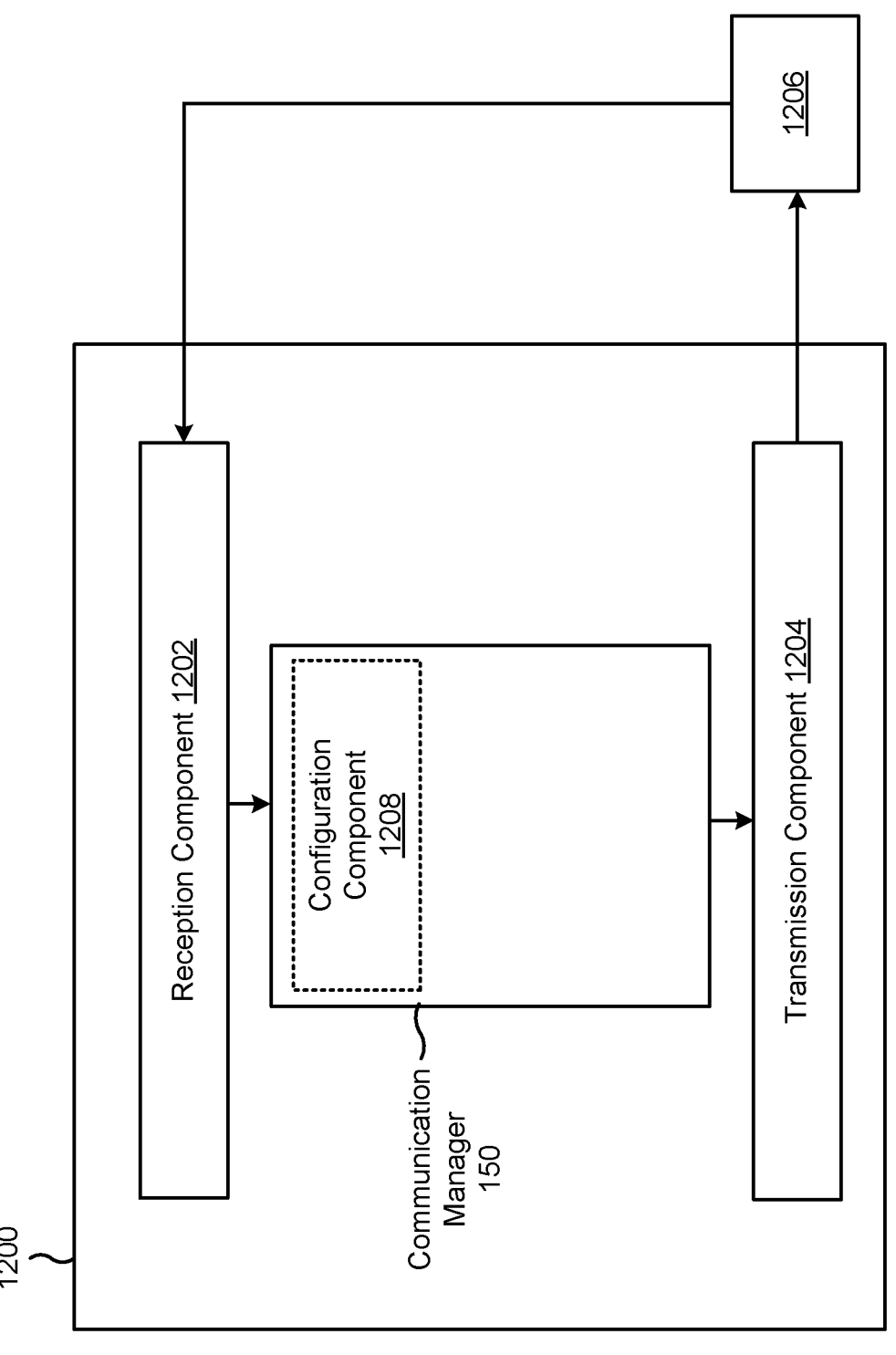
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node (e.g., network node 110), or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE 120, a network node 110, or another wireless communication device) using the reception component 1202 and the transmission component 1204. As further shown, the apparatus 1200 may include the communication manager 150. The communication manager 150 may include a configuration component 1208, among other examples.

In some aspects, the apparatus 1200 may be configured to perform one or more operations described herein in connection with FIGS. 7A-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node 110 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node 110 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node 110 described in connection with FIG. 2. In some aspects, the transmission component 1204 may be co-located with the reception component 1202 in a transceiver.

The transmission component 1204 and/or the configuration component 1208 may transmit, to a UE (e.g., UE 120), a configuration of an SRS resource. The transmission component 1204 and/or the configuration component 1208 may transmit, to the UE, an one or more indications indicating that an SRS associated with the SRS resource should be transmitted using a TD-OCC and that the UE should perform TD-OCC hopping when transmitting the SRS associated with the SRS resource. The reception component 1202 may receive, from the UE, the SRS using the SRS resource based at least in part on the configuration of the SRS resource and the TD-OCC hopping.

The transmission component 1204 and/or the configuration component 1208 may transmit, to the UE, an indication of an initial TD-OCC sequence associated with the TD-OCC hopping.

The reception component 1202 may receive, from the UE, capability information, wherein the capability information includes at least one of an indication of whether the UE supports TD-OCC for SRS transmissions, or an indication of whether the UE supports TD-OCC hopping for SRS transmissions.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving a configuration of an SRS resource; receiving one or more indications indicating that an SRS associated with the SRS resource should be transmitted using a TD-OCC and that the UE should perform TD-OCC hopping when transmitting the SRS associated with the SRS resource; and transmitting the SRS using the SRS resource based at least in part on the configuration of the SRS resource and by performing the TD-OCC hopping.

Aspect 2: The method of Aspect 1, further comprising receiving an indication of an initial TD-OCC sequence associated with performing the TD-OCC hopping.

Aspect 3: The method of any of Aspects 1-2, wherein performing the TD-OCC hopping includes switching TD-OCC sequences after each instance of the SRS resource.

Aspect 4: The method of any of Aspects 1-3, wherein performing the TD-OCC hopping includes switching TD-OCC sequences after each frequency hop associated with the SRS resource.

Aspect 5: The method of any of Aspects 1-4, wherein performing the TD-OCC hopping includes switching TD-OCC sequences after a number of symbols associated with the SRS resource.

Aspect 6: The method of Aspect 5, wherein the number of symbols associated with the SRS resource corresponds to a TD-OCC length.

Aspect 7: The method of any of Aspects 1-6, wherein performing the TD-OCC hopping includes selecting a TD-OCC sequence based at least in part on a hopping formula.

Aspect 8: The method of Aspect 7, wherein the hopping formula is associated with a pseudo-random sequence.

Aspect 9: The method of Aspect 8, wherein the pseudo-random sequence is initialized at a beginning of each radio frame based at least in part on an SRS sequence identity configured for the SRS resource.

Aspect 10: The method of Aspect 8, wherein the pseudo-random sequence is initialized at a beginning of each radio frame based at least in part on a configured pseudo-random sequence initialization parameter.

Aspect 11: The method of any of Aspects 7-10, wherein the hopping formula is a function of time.

Aspect 12: The method of any of Aspects 7-11, wherein the hopping formula is based at least in part on at least one of: a slot index within a frame; a first symbol index of the SRS resource within a slot; a first symbol index of a frequency hop within the slot; or a first symbol index of a TD-OCC block within a slot.

Aspect 13: The method of Aspect 7, wherein performing the TD-OCC hopping includes selecting a TD-OCC sequence based at least in part on a hopping formula associated with a pre-defined sequence.

Aspect 14: The method of Aspect 13, wherein the pre-defined sequence is associated with one of a sequential selection process or a bit-reversal process.

Aspect 15: The method of any of Aspects 7-14, wherein the SRS resource is associated with multiple SRS ports, wherein the TD-OCC sequence is associated with a first SRS port, of the multiple SRS ports.

Aspect 16: The method of Aspect 15, wherein performing the TD-OCC hopping includes selecting another TD-OCC sequence associated with a second SRS port, of the multiple SRS ports, based at least in part on a hopping offset.

Aspect 17: The method of Aspect 15, wherein performing the TD-OCC hopping includes using the TD-OCC sequence for a second SRS port, of the multiple SRS ports.

Aspect 18: The method of Aspect 15, wherein the hopping formula is based at least in part on an SRS port number.

Aspect 19: The method of any of Aspects 1-18, wherein the one or more indications indicating that the SRS associated with the SRS resource should be transmitted using the TD-OCC and that the UE should perform TD-OCC hopping when transmitting the SRS associated with the SRS resource is specific to one of: the SRS resource, an SRS resource set associated with the SRS resource, at least one of a bandwidth part or a component carrier associated with the SRS resource, or a subset of one or more SRS ports associated with the SRS resource.

Aspect 20: The method of any of Aspects 1-19, wherein the one or more indications indicating that the SRS associated with the SRS resource should be transmitted using the TD-OCC and that the UE should perform TD-OCC hopping when transmitting the SRS associated with the SRS resource is received via one of a radio resource control communication, a MAC-CE communication, or a downlink control information communication.

Aspect 21: The method of any of Aspects 1-20, wherein one or more indications indicating that the SRS associated with the SRS resource should be transmitted using the TD-OCC and that the UE should perform TD-OCC hopping when transmitting the SRS associated with the SRS resource is based at least in part on at least one of: a time domain behavior of the SRS resource, or a use case associated with the SRS resource.

Aspect 22: The method of any of Aspects 1-21, further comprising transmitting capability information, wherein the capability information includes at least one of: an indication of whether the UE supports TD-OCC for SRS transmissions, or an indication of whether the UE supports TD-OCC hopping for SRS transmissions.

Aspect 23: A method of wireless communication performed by a network node, comprising: transmitting, to a UE, a configuration of an SRS resource; transmitting, to the UE, one or more indications indicating that an SRS associated with the SRS resource should be transmitted using a TD-OCC and that the UE should perform TD-OCC hopping when transmitting the SRS associated with the SRS resource; and receiving, from the UE, the SRS using the SRS resource based at least in part on the configuration of the SRS resource and the TD-OCC hopping.

Aspect 24: The method of Aspect 23, further comprising transmitting, to the UE, an indication of an initial TD-OCC sequence associated with the TD-OCC hopping.

Aspect 25: The method of any of Aspects 23-24, wherein the TD-OCC hopping is associated with switching TD-OCC sequences after each instance of the SRS resource.

Aspect 26: The method of any of Aspects 23-25, wherein the TD-OCC hopping is associated with switching TD-OCC sequences after each frequency hop associated with the SRS resource.

Aspect 27: The method of any of Aspects 23-26, wherein the TD-OCC hopping is associated with switching TD-OCC sequences after a number of symbols associated with the SRS resource.

Aspect 28: The method of Aspect 27, wherein the number of symbols associated with the SRS resource corresponds to a TD-OCC length.

Aspect 29: The method of any of Aspects 23-28, wherein the TD-OCC hopping is associated with selecting a TD-OCC sequence based at least in part on a hopping formula.

Aspect 30: The method of Aspect 29, wherein the hopping formula is associated with a pseudo-random sequence.

Aspect 31: The method of Aspect 30, wherein the pseudo-random sequence is initialized at a beginning of each radio frame based at least in part on an SRS sequence identity configured for the SRS resource.

Aspect 32: The method of Aspect 30, wherein the pseudo-random sequence is initialized at a beginning of each radio frame based at least in part on a configured pseudo-random sequence initialization parameter.

Aspect 33: The method of any of Aspects 29-32, wherein the hopping formula is a function of time.

Aspect 34: The method of any of Aspects 29-33, wherein the hopping formula is based at least in part on at least one of: a slot index within a frame; a first symbol index of the SRS resource within a slot; a first symbol index of a frequency hop within the slot; or a first symbol index of a TD-OCC block within a slot.

Aspect 35: The method of Aspect 29, wherein the TD-OCC hopping is associated with selecting a TD-OCC sequence based at least in part on a hopping formula associated with a pre-defined sequence.

Aspect 36: The method of Aspect 35, wherein the pre-defined sequence is associated with one of a sequential selection process or a bit-reversal process.

Aspect 37: The method of any of Aspects 29-36, wherein the SRS resource is associated with multiple SRS ports, wherein the TD-OCC sequence is associated with a first SRS port, of the multiple SRS ports.

Aspect 38: The method of Aspect 37, wherein the TD-OCC hopping is associated with selecting another TD-OCC sequence associated with a second SRS port, of the multiple SRS ports, based at least in part on a hopping offset.

Aspect 39: The method of Aspect 37, wherein the TD-OCC hopping is associated with using the TD-OCC sequence for a second SRS port, of the multiple SRS ports.

Aspect 40: The method of Aspect 37, wherein the hopping formula is based at least in part on an SRS port number.

Aspect 41: The method of any of Aspects 23-40, wherein the one or more indications indicating that the SRS associated with the SRS resource should be transmitted using the TD-OCC and that the UE should perform TD-OCC hopping when transmitting the SRS associated with the SRS resource is specific to one of: the SRS resource, an SRS resource set associated with the SRS resource, at least one of a bandwidth part or a component carrier associated with the SRS resource, or a subset of one or more SRS ports associated with the SRS resource.

Aspect 42: The method of any of Aspects 23-41, wherein the one or more indications indicating that the SRS associated with the SRS resource should be transmitted using the TD-OCC and that the UE should perform TD-OCC hopping when transmitting the SRS associated with the SRS resource is transmitted via one of a radio resource control communication, a MAC-CE communication, or a downlink control information communication.

Aspect 43: The method of any of Aspects 23-42, wherein the one or more indications indicating that the SRS associated with the SRS resource should be transmitted using the TD-OCC and that the UE should perform TD-OCC hopping when transmitting the SRS associated with the SRS resource is based at least in part on at least one of: a time domain behavior of the SRS resource, or a use case associated with the SRS resource.

Aspect 44: The method of any of Aspects 23-43, further comprising receiving, from the UE, capability information, wherein the capability information includes at least one of: an indication of whether the UE supports TD-OCC for SRS transmissions, or an indication of whether the UE supports TD-OCC hopping for SRS transmissions.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-22.

Aspect 47: An apparatus for wireless communication, comprising at least one means for performing the method of one or more of Aspects 1-22.

Aspect 48: A non-transitory computer-readable medium storing code for wireless communication, the code comprising instructions executable by a processor to perform the method of one or more of Aspects 1-22.

Aspect 49: A non-transitory computer-readable medium storing a set of instructions for wireless communication, the set of instructions comprising one or more instructions that, when executed by one or more processors of a device, cause the device to perform the method of one or more of Aspects 1-22.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
   receive a configuration of a sounding reference signal (SRS) resource;
   receive one or more indications indicating that an SRS associated with the SRS resource should be transmitted using a time domain orthogonal cover code (TD-OCC) and that the UE should perform TD-OCC hopping for a transmission of the SRS associated with the SRS resource;
   initialize a pseudo-random sequence at a beginning of each radio frame based at least in part on an SRS sequence identity configured for the SRS resource;
   select, based at least in part on a hopping formula that incorporates the pseudo-random sequence, a TD-OCC sequence to apply to the transmission of the SRS,
   wherein the selected TD-OCC sequence corresponds to a pseudo-random number generated from the hopping formula; and
   transmit the SRS using the SRS resource based at least in part on the configuration of the SRS resource, the selected TD-OCC sequence, and the TD-OCC hopping.

2. The apparatus of claim 1, wherein the one or more processors are further configured to receive an indication of an initial TD-OCC sequence associated with the TD-OCC hopping.

3. The apparatus of claim 1, wherein the one or more processors are further configured to switch TD-OCC sequences after each instance of the SRS resource.

4. The apparatus of claim 1, wherein the one or more processors are further configured to switch TD-OCC sequences after each frequency hop associated with the SRS resource.

5. The apparatus of claim 1, wherein the one or more processors are further configured to switch TD-OCC sequences after a number of symbols associated with the SRS resource.

6. The apparatus of claim 5, wherein the number of symbols associated with the SRS resource corresponds to a TD-OCC length.

7. The apparatus of claim 1, wherein the one or more processors are further configured to initialize the pseudo-random sequence at a beginning of each radio frame based at least in part on a configured pseudo-random sequence initialization parameter.

8. The apparatus of claim 1, wherein the hopping formula is a function of time.

9. The apparatus of claim 1, wherein the hopping formula is based at least in part on at least one of:
   a slot index within a frame;
   a first symbol index of the SRS resource within a slot;
   a first symbol index of a frequency hop within the slot; or
   a first symbol index of a TD-OCC block within a slot.

10. The apparatus of claim 1, wherein the one or more processors, to perform another TD-OCC hopping, are configured to select a TD-OCC sequence based at least in part on a hopping formula associated with a pre-defined sequence.

11. The apparatus of claim 10, wherein the pre-defined sequence is associated with one of a sequential selection process or a bit-reversal process.

12. The apparatus of claim 1, wherein the SRS resource is associated with multiple SRS ports, wherein the selected TD-OCC sequence is associated with a first SRS port, of the multiple SRS ports.

13. The apparatus of claim 12, wherein the one or more processors are further configured to select another TD-OCC sequence associated with a second SRS port, of the multiple SRS ports, based at least in part on a hopping offset.

14. The apparatus of claim 12, wherein the one or more processors are further configured to use the selected TD-OCC sequence for a second SRS port, of the multiple SRS ports.

15. The apparatus of claim 12, wherein the hopping formula is based at least in part on an SRS port number.

16. The apparatus of claim 1, wherein the one or more indications indicating that the SRS associated with the SRS resource should be transmitted using the TD-OCC and that the UE should perform the TD-OCC hopping when transmitting the SRS associated with the SRS resource is specific to one of:

the SRS resource, an SRS resource set associated with the SRS resource, at least one of a bandwidth part or a component carrier associated with the SRS resource, or a subset of one or more SRS ports associated with the SRS resource.

17. The apparatus of claim 1, wherein the one or more indications indicating that the SRS associated with the SRS resource should be transmitted using the TD-OCC and that the UE should perform the TD-OCC hopping when transmitting the SRS associated with the SRS resource is based at least in part on at least one of:

a time domain behavior of the SRS resource, or a use case associated with the SRS resource.

18. The apparatus of claim 1, wherein the one or more processors are further configured to transmit capability information, wherein the capability information includes at least one of:

an indication of whether the UE supports TD-OCC for SRS transmissions, or an indication of whether the UE supports TD-OCC hopping for SRS transmissions.

19. An apparatus for wireless communication at a network node, comprising:

one or more memories; and one or more processors, coupled to the one or more memories, configured to:

transmit, to a user equipment (UE), a configuration of a sounding reference signal (SRS) resource;

transmit, to the UE, one or more indications indicating that an SRS associated with the SRS resource should be transmitted using a time domain orthogonal cover code (TD-OCC) and that the UE should perform TD-OCC hopping when transmitting the SRS associated with the SRS resource;

initialize a hopping formula, that incorporates a pseudo-random sequence, associated with the TD-OCC hopping, wherein the pseudo-random sequence is initialized at a beginning of each radio frame based at least in part on an SRS sequence identity configured for the SRS resource; and receive, from the UE, the SRS using the SRS resource based at least in part on the configuration of the SRS resource and a TD-OCC sequence selected based at least in part on the hopping formula, wherein the TD-OCC sequence corresponds to a pseudo-random number generated from the hopping formula.

20. The apparatus of claim 19, wherein the TD-OCC hopping is associated with a TD-OCC sequence switch after each instance of the SRS resource.

21. The apparatus of claim 19, wherein the TD-OCC hopping is associated with a TD-OCC sequence switch after each frequency hop associated with the SRS resource.

22. The apparatus of claim 19, wherein the TD-OCC hopping is associated with a TD-OCC sequence switch after a number of symbols associated with the SRS resource.

23. A method of wireless communication performed by a user equipment (UE), comprising:

receiving a configuration of a sounding reference signal (SRS) resource;

receiving one or more indications indicating that an SRS associated with the SRS resource should be transmitted using a time domain orthogonal cover code (TD-OCC) and that the UE should perform TD-OCC hopping when transmitting the SRS associated with the SRS resource;

initializing pseudo-random sequence at a beginning of each radio frame based at least in part on an SRS sequence identity configured for the SRS resource;

selecting, based at least in part on a hopping formula that incorporates the pseudo-random sequence, a TD-OCC sequence to apply to a transmission of the SRS, wherein the selected TD-OCC sequence corresponds to a pseudo-random number generated from the hopping formula; and transmitting the SRS using the SRS resource based at least in part on the configuration of the SRS resource, the selected TD-OCC sequence, and the TD-OCC hopping.

24. The method of claim 23, further comprising:

initializing the pseudo-random sequence at a beginning of each radio frame based at least in part on a configured pseudo-random sequence initialization parameter.

25. The method of claim 23, wherein the hopping formula is a function of time.

26. The method of claim 23, wherein the hopping formula is based at least in part on at least one of:

a slot index within a frame;

a first symbol index of the SRS resource within a slot;

a first symbol index of a frequency hop within the slot; or a first symbol index of a TD-OCC block within a slot.

27. The method of claim 23, further comprising:

receiving an indication of an initial TD-OCC sequence associated with the TD-OCC hopping.

28. The method of claim 23, further comprising:

switching TD-OCC sequences after each instance of the SRS resource.

29. A method of wireless communication performed by a network node, comprising:

transmitting, to a user equipment (UE), a configuration of a sounding reference signal (SRS) resource;

transmitting, to the UE, one or more indications indicating that an SRS associated with the SRS resource should be transmitted using a time domain orthogonal cover code (TD-OCC) and that the UE should perform TD-OCC hopping when transmitting the SRS associated with the SRS resource;

initializing a hopping formula, that incorporates a pseudo-random sequence, associated with the TD-OCC hopping, wherein the pseudo-random sequence is initialized at a beginning of each radio frame based at least in part on an SRS sequence identity configured for the SRS resource; and receiving, from the UE, the SRS using the SRS resource based at least in part on the configuration of the SRS resource and a TD-OCC sequence selected based at least in part on the hopping formula, wherein the TD-OCC sequence corresponds to a pseudo-random number generated from the hopping formula.

30. The method of claim 29, wherein the TD-OCC hopping is associated with one of a TD-OCC sequence switch after each instance of the SRS resource, a TD-OCC sequence switch after each frequency hop associated with the SRS resource, or a TD-OCC sequence switch after a number of symbols associated with the SRS resource.

\* \* \* \* \*